(12) United States Patent
Noorani

(10) Patent No.: US 11,660,906 B2
(45) Date of Patent: May 30, 2023

(54) CARPENTER PENCIL CALIPER

(71) Applicant: Jonathan Noorani, Orangevale, CA (US)

(72) Inventor: Jonathan Noorani, Orangevale, CA (US)

( * ) Notice: Subject to any disclaimer, the term of this patent is extended or adjusted under 35 U.S.C. 154(b) by 91 days.

(21) Appl. No.: 17/477,788

(22) Filed: Sep. 17, 2021

(65) Prior Publication Data

US 2023/0091014 A1    Mar. 23, 2023

(51) Int. Cl.
*G01B 3/38* (2006.01)
*B43K 29/08* (2006.01)
*B43L 9/24* (2006.01)

(52) U.S. Cl.
CPC .............. *B43L 9/24* (2013.01); *B43K 29/08* (2013.01); *G01B 3/38* (2013.01)

(58) Field of Classification Search
CPC ............ B43K 29/08; G01B 3/20; G01B 3/38
See application file for complete search history.

(56) References Cited

U.S. PATENT DOCUMENTS

| | | | | |
|---|---|---|---|---|
| 427,956 A * | 5/1890 | Bellow | ............... | G01B 3/20 33/806 |
| 758,283 A * | 4/1904 | Shafer | ............... | G01B 3/20 33/812 |
| 991,478 A * | 5/1911 | Castro | ............... | G01B 3/20 33/679.1 |
| 1,649,495 A * | 11/1927 | Soucy | ............... | G01B 3/20 33/810 |
| 2,388,252 A * | 11/1945 | Crane | ............... | B43K 29/08 401/6 |
| 2,677,186 A * | 5/1954 | Sorensen | ............... | G01B 5/143 33/520 |
| RE24,224 E * | 9/1956 | Sorensen | ............... | G01B 3/20 33/520 |
| 8,826,557 B2 * | 9/2014 | Yang | ............... | G01B 3/20 33/808 |
| 8,864,397 B2 * | 10/2014 | Ryan | ............... | G01C 9/26 401/52 |
| 11,084,318 B2 * | 8/2021 | Kurani | ............... | B43K 23/12 |

FOREIGN PATENT DOCUMENTS

DE    102010007721 A1 *    8/2011    ............ B43K 29/00

* cited by examiner

*Primary Examiner* — David P Angwin
*Assistant Examiner* — Bradley S Oliver
(74) *Attorney, Agent, or Firm* — Craig A. Simmermon

(57) ABSTRACT

Carpenter pencil caliper is a two-piece device that attaches to a carpenter's pencil with a scale, ruler imprint, or rule imprint on the carpenter's pencil wherein this three-piece assembly is then used as a caliper to measure the length, width, and/or height of a workpiece. This three-piece assembly may also be used to mark or scribe a line in a workpiece at a specific, precise, or measured location and/or mark or scribe a specifically sized or measured circle in a workpiece at a specific, precise, or measured location. The two-piece device is a specially designed and shaped to reversibly attach to a standard sized carpenter's pencil in order to perform the marking and/or scribing of the workpiece. A workpiece is a piece of building material such as wood, composite, or metal that is used to build a structure or a device.

5 Claims, 18 Drawing Sheets

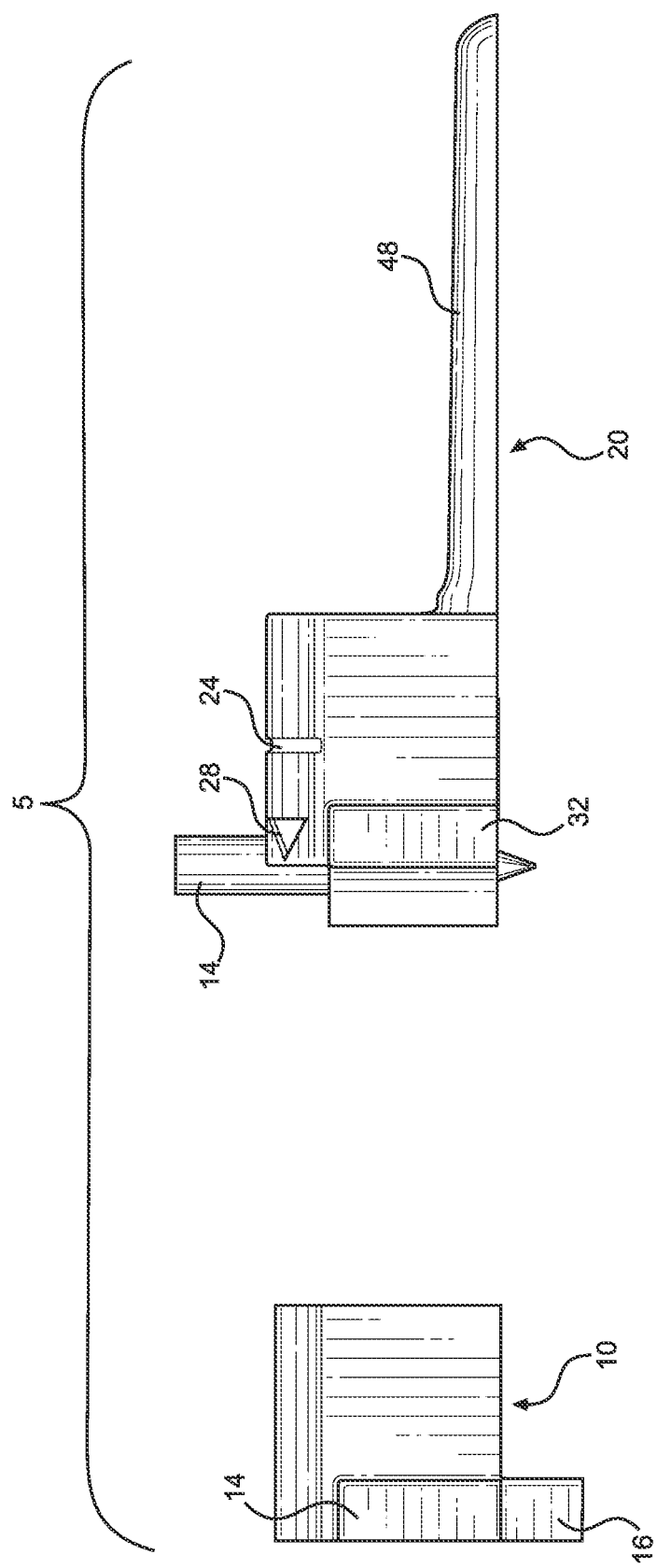

CARPENTER PENCIL CALIPER

BACKGROUND OF THE INVENTION

1. Field of the Invention

This invention relates to a two-piece device that attaches to a carpenter's pencil with a scale, ruler imprint, or rule imprint on the carpenter's pencil wherein this three-piece assembly is then used as a caliper to measure the length, width, and/or height of a workpiece. This three-piece assembly may also be used to mark or scribe a line in a workpiece at a specific, precise, or measured location and/or mark or scribe a specifically sized or measured circle in a workpiece at a specific, precise, or measured location. The two-piece device is a specially designed and shaped to reversibly attach to a standard sized carpenter's pencil in order to perform the marking and/or scribing of the workpiece. A workpiece is a piece of building material such as wood, composite, or metal that is used to build a structure or a device.

2. Description of Related Art

There are many carpenter's pencils in the prior art. This invention does not include a carpenter's pencil, however, this invention must be attached to a carpenter's pencil in order to function. Specifically, this invention must be attached to a carpenter's pencil with a scale, ruler imprint, or rule imprinted on the carpenter's pencil in order to function properly. This invention is reversibly attachable to a carpenter's pencil.

There are many calipers in the prior art. A caliper is a device used to measure the dimensions of an object. A caliper can measure: 1) an outside dimension or an overall outer dimension of a workpiece; 2) an inside dimension or an inside gap measurement of a workpiece; and/or 3) a height of a workpiece. When this invention is attached properly to a carpenter's pencil with a scale, ruler imprint, or rule imprint, the assembly can be used to measure inside dimensions, outside dimensions, and height dimensions. Also, this assembly can be used to mark or scribe a straight line on a work piece at an exact location. Also, this assembly can be used to mark or scribe a precisely sized circle on a work piece at an exact location.

There are no other calipers in the prior art that are reversibly attachable to a carpenter's pencil that include a proximal component with an end socket and a first and second tab, as shown and described below. There are no other calipers in the prior art that are reversibly attachable to a carpenter's pencil that also include a distal component with a mid-section socket, first, second, and third tabs, graduation lines, arrows, a scribing tool, and a marking tool, as shown and described below. There are no other calipers in the prior that use a proximal component with these features and distal component with these features in order to measure, mark, and scribe a workpiece as shown and described below.

BRIEF SUMMARY OF THE INVENTION

It is an object of carpenter's pencil caliper to include a proximal component and a distal component.

It is an object of the proximal component of carpenter's pencil caliper to be reversibly attachable to a carpenter's pencil.

It is an object of the distal component of carpenter's pencil caliper to be slidably reversibly attachable to a carpenter's pencil.

It is an object of carpenter's pencil caliper to measure an outside dimension or an overall outer dimension of a workpiece when attached to a carpenter's pencil with a scale, ruler imprint, or rule imprint.

It is an object of carpenter's pencil caliper to measure an inside dimension or an inside gap measurement of a workpiece when attached to a carpenter's pencil with a scale, ruler imprint, or rule imprint.

It is an object of carpenter's pencil caliper to measure the height of a workpiece when attached to a carpenter's pencil with a scale, ruler imprint, or rule imprint.

It is an object of carpenter's pencil caliper to mark or scribe a straight line on a work piece at an exact location when attached to a carpenter's pencil with a scale, ruler imprint, or rule imprint.

It is an object of carpenter's pencil caliper to mark or scribe a precisely sized circle on a work piece at an exact location on a work piece at an exact location when attached to a carpenter's pencil with a scale, ruler imprint, or rule imprint.

BRIEF DESCRIPTION OF THE DRAWINGS

FIG. 6 is a is a left side elevation view of carpenter pencil caliper.

DEFINITION LIST

Figure 1:
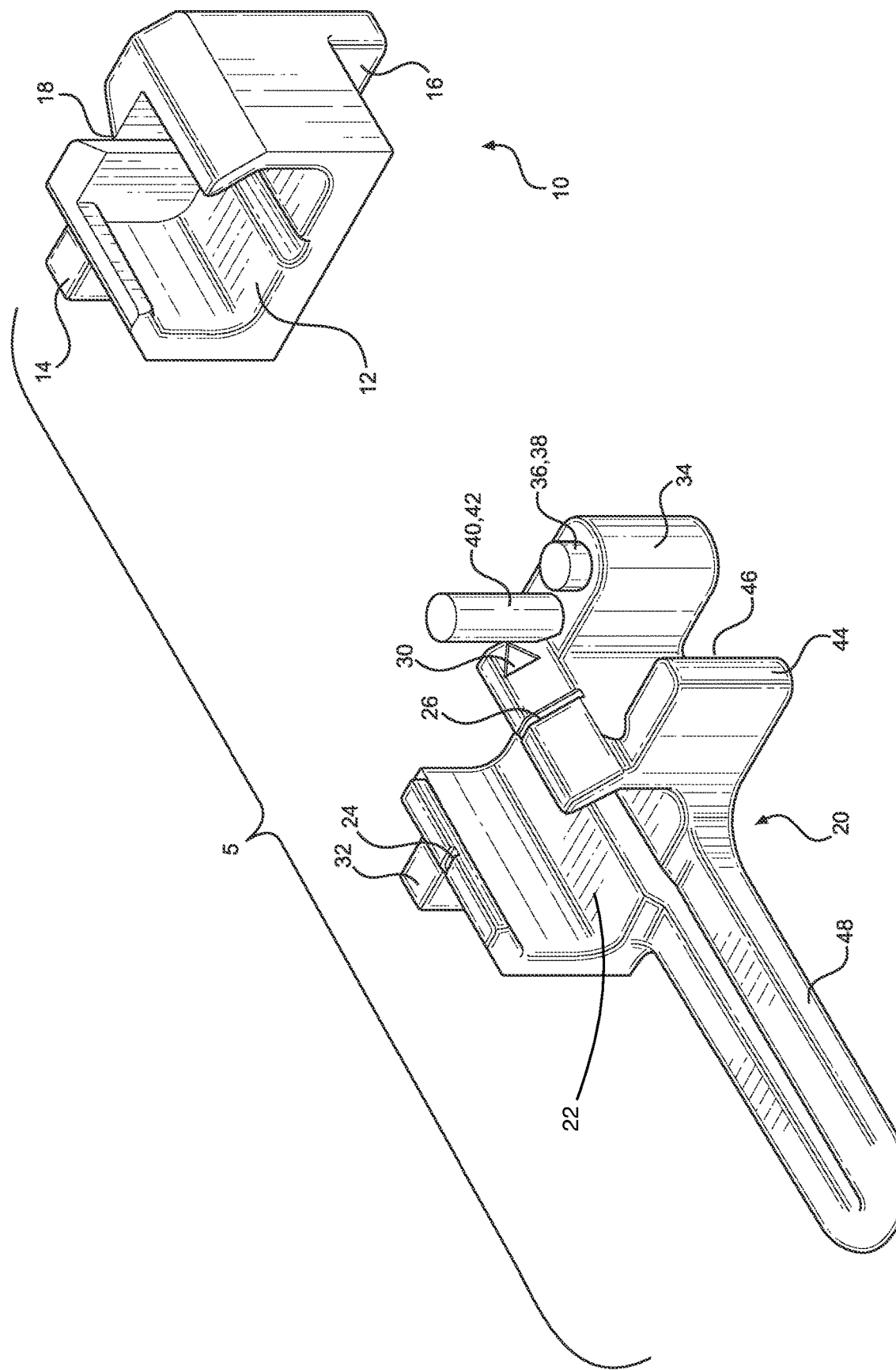
FIG. 1 is a perspective view of carpenter pencil caliper.
Figure 2:
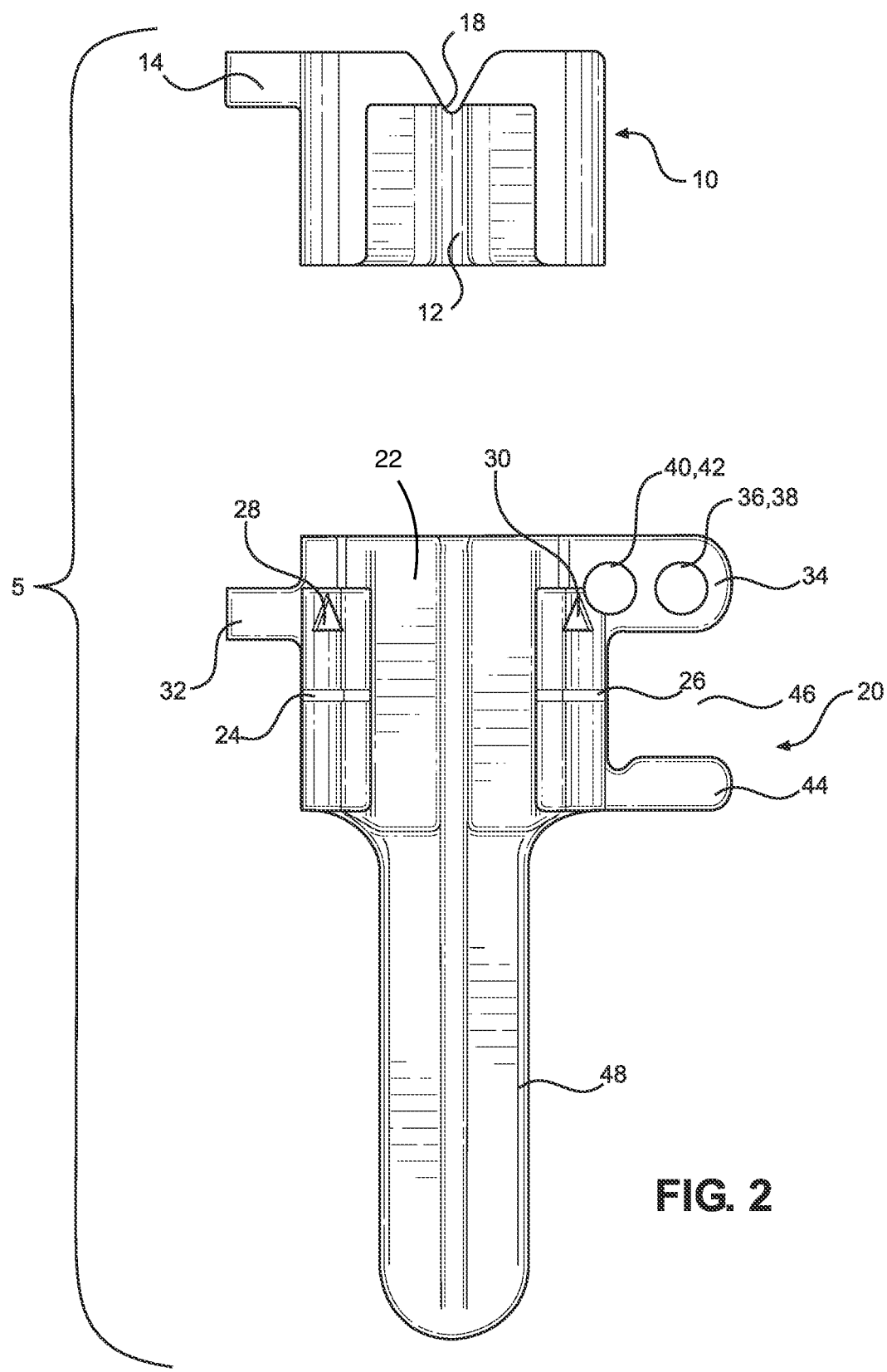
FIG. 2 is a top plan view of carpenter pencil caliper.
Figure 3:
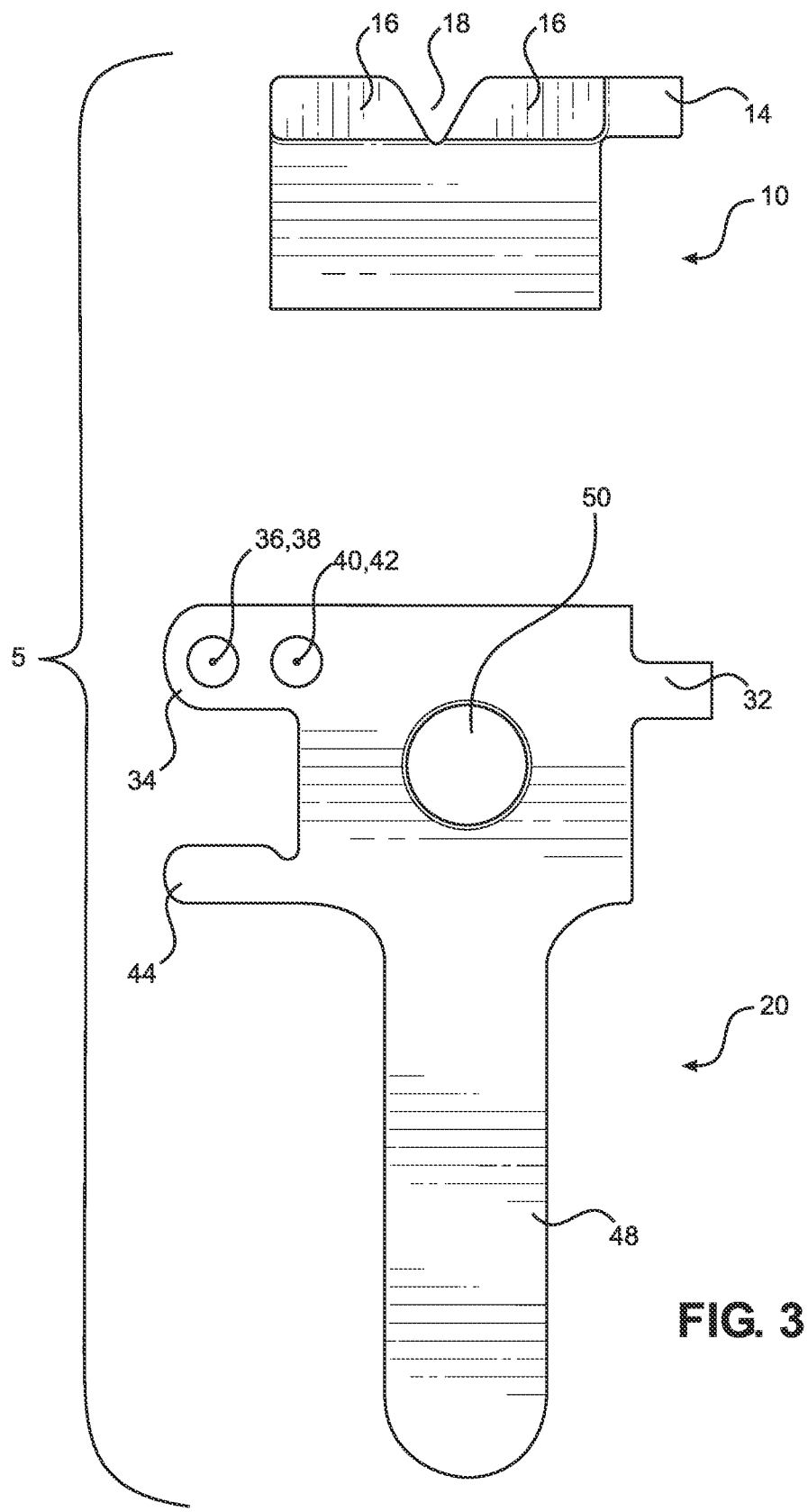
FIG. 3 is a bottom plan view of carpenter pencil caliper.
Figure 5:
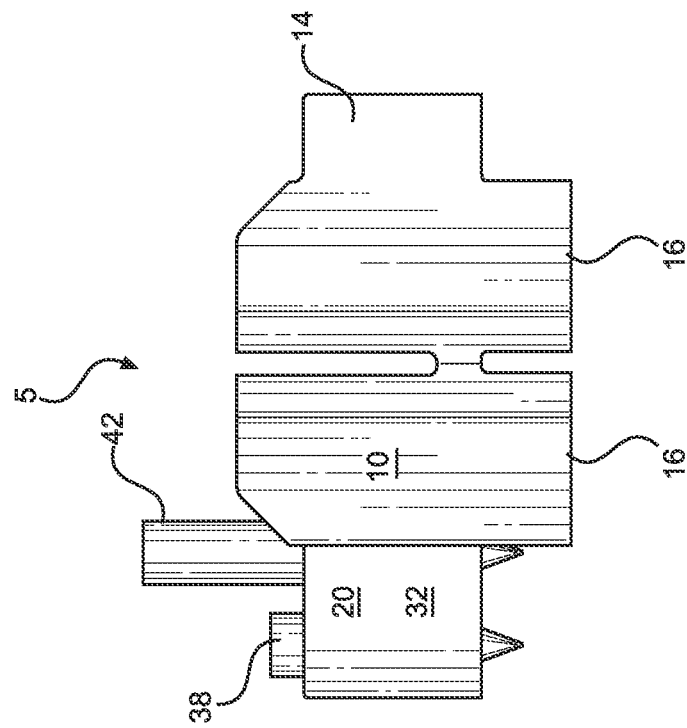
FIG. 5 is a is a rear elevation view of carpenter pencil caliper.
Figure 4:
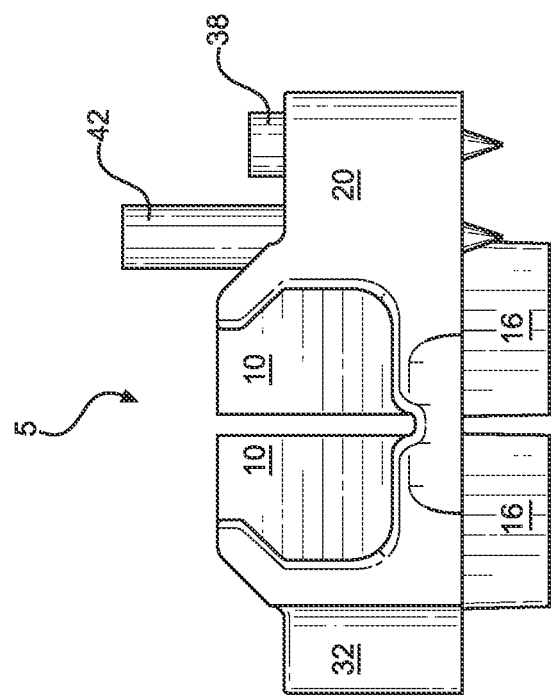
FIG. 4 is a is a front elevation view of carpenter pencil caliper.
Figure 7:
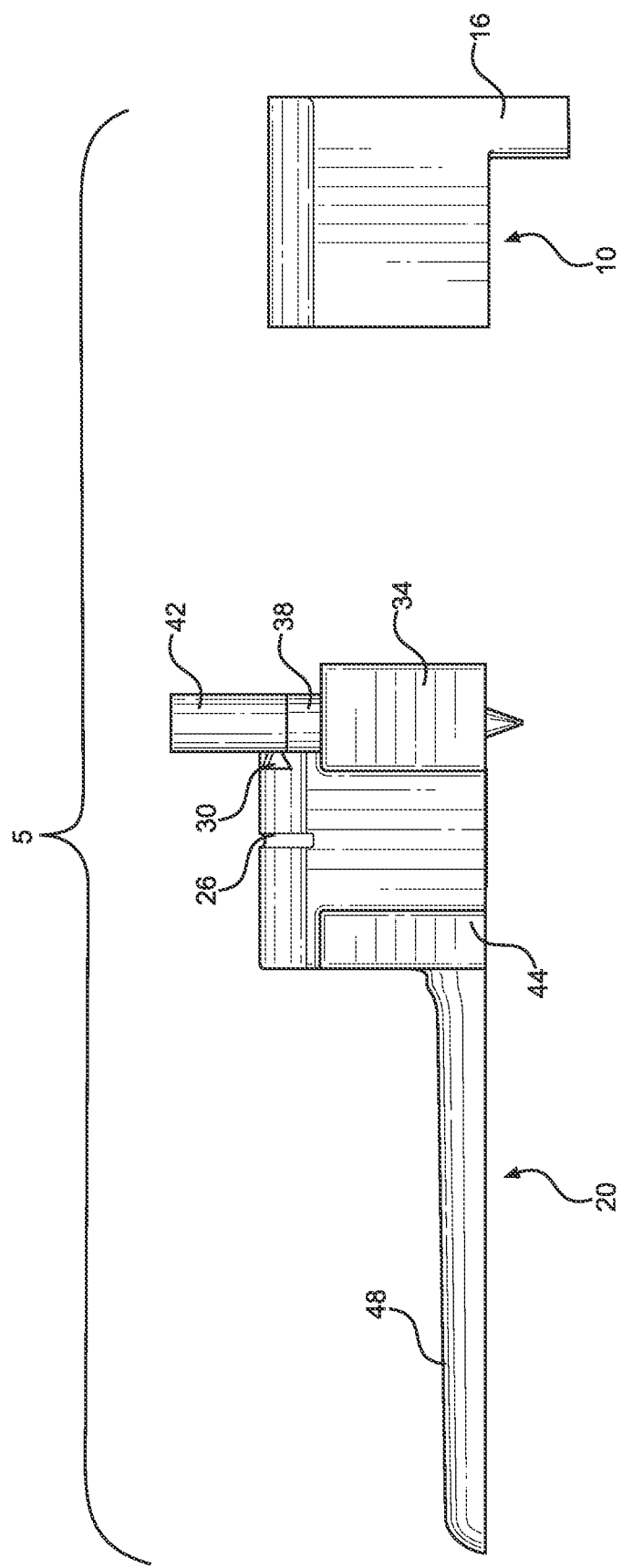
FIG. 7 is a is a right side elevation view of carpenter pencil caliper.

| Term | Definition |
| --- | --- |
| 5 | Carpenter Pencil Caliper |
| 10 | Proximal Component |
| 12 | End Socket on Proximal Component |
| 14 | First Tab on Proximal Component |
| 16 | Second Tab on Proximal Component |
| 18 | Pivot Notch on Proximal Component |
| 20 | Distal Component |
| 22 | Mid-Section Socket on Distal Component |
| 24 | First Graduation Line on Mid-Section Socket |
| 26 | Second Graduation Line on Mid-Section Socket |
| 28 | First Arrow Indicator on Mid-Section Socket |
| 30 | Second Arrow Indicator on Mid-Section Socket |
| 32 | First Tab on Distal Component |
| 34 | Second Tab on Distal Component |
| 36 | Scribe Socket on Second Tab on Distal Component |
| 38 | Scribing Tool Insert |
| 40 | Marking Socket on Second Tab on Distal Component |
| 42 | Marking Tool Insert |
| 44 | Third Tab on Distal Component |
| 46 | Carpenter's Pencil Cradle |
| 48 | Pocket Clip on Distal Component |
| 50 | Magnet |
| 100 | Carpenter's Pencil |
| 102 | Lower Scale, Ruler, or Rule Imprint on Carpenter's Pencil |
| 104 | Upper Scale, Ruler, or Rule Imprint on Carpenter's Pencil |
| 110 | Workpiece |
| 120 | Mark Line or Scribe Line on Workpiece |
| 125 | Mark Circle or Scribe Circle on Workpiece |
| 130 | Screw or Nail |

DETAILED DESCRIPTION OF THE INVENTION

Carpenter pencil caliper 5 comprises: a proximal component 10 and a distal component 20. Proximal component 10 and distal component 20 are each reversibly attachable to a standard sized carpenter's pencil 100. A carpenter's pencil 100, carpenter pencil 100, carpentry pencil 100, or similar is a pencil that has a body with an overall rectangular or elongated octagonal cross-section to prevent the pencil from rolling away. A carpenter's pencil 100 is a well-known standard in the carpentry field in this country. The overall rectangular or elongated octagonal cross-section has a width of about 0.5 inches and a thickness of about 0.25 inches, wherein the width is greater than the thickness to yield the overall rectangular or elongated octagonal cross-section shape. With this cross-sectional shape, a carpenter's pencil 100 may easily rest on either of its broad sides on a board or workpiece without rolling off even if the board or workpiece slightly tilted. Carpenter's pencils 100 are easier to grip than standard pencils, because they have a larger surface area. Also, the non-round or rectangular shaped core allows thick or thin lines to be drawn by holding the pencil at different angles. Carpenter's pencils 100 are used by builders because they can mark on surfaces like concrete or stone. A carpenter's pencil 100 is about 7 inches long in the unsharpened condition. A carpenter's pencil 100 has a proximal end, a distal end, an imprint side, a workpiece side, a first side, and a second side, a middle section, and a longitudinal axis. The proximal end is the end of the carpenter's pencil 100 that is closest to the user when the carpenter pencil caliper 5 is being used properly. The distal end is the end of carpenter's pencil 100 that is farthest from the user when the carpenter pencil caliper 5 is being used properly. The distal end of carpenter's pencil 100 is the end that is opposite from the proximal end and vice versa. The imprint side of carpenter's pencil 100 is the side that is adjacent and contiguous with the scale, ruler, or rule imprint on the carpenter's pencil 100. The workpiece side of carpenter's pencil 100 is the side that opposite from the imprint side and is adjacent and contiguous with the workpiece when carpenter pencil caliper 5 is being properly used. The first side of carpenter's pencil 100 is the side that is adjacent and contiguous with the lower scale, ruler imprint, or rule imprint 102 when carpenter pencil caliper 5 is properly attached to a carpenter's pencil 100. The lower scale, ruler imprint, or rule imprint 102 is the scale that is on the bottom of the carpenter's pencil 100 when the carpenter's pencil 100 is orientated properly so that the numbers on the scale read properly from left to right. The second side of carpenter's pencil 100 is the side that is adjacent and contiguous with the upper scale, ruler imprint, or rule imprint 104 when carpenter pencil caliper 5 is properly attached to a carpenter's pencil 100. The upper scale, ruler imprint, or rule imprint 104 is the scale that is on the top of the carpenter's pencil 100 when the carpenter's pencil 100 is orientated properly so that the numbers on the scale read properly from left to right. The orientation and designation of a proximal end, a distal end, an imprint side, a workpiece side, a first side, and a second side will be used in this way throughout this writing in order to describe the invention and the process of using the invention.

In order for carpenter pencil caliper 5 to be used properly, the proximal component 10 and distal component 20 should each be attached to a carpenter's pencil 100 with a ruler or rule imprinted on one of the broad sides of the carpenter's pencil 100. The scale, ruler imprint, or rule imprint typically has a lower scale, ruler imprint, or rule imprint 102 and an upper scale, ruler imprint, or rule imprint 104. The lower scale, ruler imprint, or rule imprint 102 may be scaled in inches or centimeters of other units. The upper scale, ruler imprint, or rule imprint 104 may be scaled in inches or centimeters of other units. Carpenter's pencils 100 with a lower scale, ruler imprint, or rule imprint 102 scaled in millimeters and an upper scale, ruler imprint, or rule imprint 104 scaled in inches are readily available in the marketplace.

The proximal component 10 is reversibly attachable to the proximal end of the carpenter's pencil 100, as shown and described below. The proximal component 10 may be attached onto the proximal end of the carpenter's pencil 100 and then taken off. The proximal end of the carpenter's pencil 100 is the unsharpened end that is closest to the user when the carpenter's pencil 100 is in use. The distal component 20 is reversibly slidably attachable to the middle section of carpenter's pencil 100, as shown and described below. Thus, the distal component 20 may be attached onto the middle section of carpenter's pencil 100, and then slid back and forth along the longitudinal axis of the carpenter's pencil 100, and then taken off of the middle section of carpenter's pencil 100. As shown and described below, the distal component 20 optionally includes first and second graduation lines 24, 26 and first and second arrow indicators 28, 30 which are used in conjunction with the scale, ruler, or rule imprinted on one of the broad sides of the carpenter's pencil 100 in order to measure or determine a dimension on a work piece or mark or scribe a work piece at a specific location.

Proximal component 10 comprises: an end socket 12; a first tab 14; and a second tab 16. Proximal component 10 is a specially shaped rigid member. Proximal component 10 has a proximal end, a distal end, an imprint side, a workpiece side, a first side, and a second side. The proximal end of proximal component 10 is the end of proximal component 10 that is closest to the user when the carpenter pencil caliper 5 is being used properly. The distal end of proximal component 10 is the end of proximal component 10 that is farthest from the user when the carpenter pencil caliper 5 is being used properly. The distal end of proximal component 10 is the end that is opposite from the proximal end of proximal component 10 and vice versa. The distal end of proximal component 10 is reversibly attachable to the proximal end of a carpenter's pencil 100. The imprint side of proximal component 10 is the side that is adjacent and contiguous with the ruler or rule imprint on the carpenter's pencil 100 when the proximal component 10 is properly attached to the carpenter's pencil 100. The workpiece side of proximal component 10 is the side that opposite from the imprint side and is adjacent and contiguous with the workpiece 110 when carpenter pencil caliper 5 is being properly used. The first side of proximal component 10 is the side of proximal component 10 that is adjacent and contiguous with the lower scale, ruler imprint, or rule imprint when carpenter pencil caliper 5 is properly attached to a carpenter's pencil 100. The lower scale, ruler imprint, or rule imprint 102 is the scale that is on the bottom of the carpenter's pencil 100 when the carpenter's pencil 100 is orientated properly so that the numbers on the scale read properly from left to right. The second side of proximal component 10 is the side of proximal component 10 that is adjacent and contiguous with the upper scale, ruler imprint, or rule imprint 104 when carpenter pencil caliper 5 is properly attached to a carpenter's pencil 100. The upper scale, ruler imprint, or rule imprint 104 is the scale that is on the top of the carpenter's pencil 100 when the carpenter's pencil 100 is orientated properly so that the numbers on the scale read properly from left to right. The orientation and designation of a proximal end, a distal end, an imprint side, a workpiece side, a first side, and a second side will be used in this way throughout this writing in order to describe the invention and the process of using the invention.

End socket 12 is a rigid cup-shaped member, concave-shaped member, or socket-shaped member located at the distal end of proximal component 10. End socket 12 has an inside width of about 0.2 to 0.4 inches and an inside thickness of about 0.4 to 0.7 inches. End socket 12 is sized and shaped to make a press fit or slip fit onto the unsharpened proximal end of a carpenter's pencil 100, as depicted. End socket 12 has precise inner dimensions that are dictated by the thickness and width of a standard carpenter's pencil 100. End socket 12 has a precise cup shape that is the reverse of the shape of the end of a standard carpenter's pencil 100. End socket 12 has an inner width and an inner length that are sized to a press fit or a slip fit with the thickness and the width of a standard carpenter's pencil 100, respectively. A press fit is an interference fit where the two parts are fastened together by normal force or friction force between the two parts, thus end socket 12 must have an ever so slightly less width dimension and thickness dimension of those of the carpenter's pencil 100 in order to yield the proper press fit between these two members. A slip fit is a clearance fit where there is a small degree of space between the two parts. The end of the carpenter's pencil 100 that is adjacent to the zeros on the lower and upper scales, ruler imprints, or rule imprints 102, 104 is the proximal end of the carpenter's pencil 100 that is typically left unsharpened. End socket 12 has a proximal end, a distal end, an imprint side, a workpiece side, a first side, and a second side.

The proximal end of end socket 12 is a solid rigid planar member that caps or covers the proximal end of a carpenter's pencil 100 when proximal component 10 is properly attached to the proximal end of proximal end of a carpenter's pencil 100. The proximal end of end socket 12 has a proximal surface, a distal surface, an imprint edge, a workpiece edge, a first edge, and a second edge. Proximal end of end socket 12 has a width slightly greater than that of a carpenter's pencil 100. The distal end of end socket 12 is open and without any structure. The distal end of end socket 12 is the open end of the cup-shaped, concave-shaped, or socket-shaped member. In order to attach the proximal end of the carpenter's pencil 100 to the proximal component 10, the proximal end of the carpenter's pencil 100 is inserted into the distal end of end socket 12. The imprint side of end socket 12 is open and without any structure. The imprint side of end socket 12 is an open side of the cup-shaped, concave-shaped, or socket-shaped member. This open side or imprint side of end socket 12 functions to allow the lower and upper scale, ruler imprint, or rule imprint 102, 104 to be seen and read by the user of the carpenter pencil caliper 5. The workpiece side of end socket 12 is a solid rigid planar member that covers the workpiece side of carpenter's pencil 100 at the proximal end of the carpenter's pencil 100 when proximal component 10 is properly attached to the proximal end of a carpenter's pencil 100. The workpiece side of end socket 12 has a proximal edge, a distal edge, an inner surface, an outer surface, a first edge, and a second edge. The first side of end socket 12 is a solid rigid planar member that covers the first side of a carpenter's pencil 100 at the proximal end of a carpenter's pencil 100 when proximal component 10 is properly attached to the proximal end of proximal end of a carpenter's pencil 100. The first side of end socket 12 has a proximal edge, a distal edge, an imprint edge, a workpiece edge, an inner surface, and an outer surface. The imprint edge of the first side of end socket 12 is bezeled or includes an additional solid rigid planar member connected thereto that is angled 45 degrees towards the second side of end socket as depicted. The additional 45 degree planar member of the first side has a proximal edge, a distal edge, a first edge, and a second edge. This bezel or 45 degree angled section wraps around the first side of carpenter's pencil 100 in order to snap onto the first side of carpenter's pencil 100 or help grab and hold onto the first side of carpenter's pencil 100. If the carpenter's pencil 100 has an elongated octagonal shaped cross section, this bezel or 45 degree angled section wraps around the octagonal side between the imprint side and the first side of carpenter's pencil 100 and is adjacent to the octagonal side between the imprint side and the first side of carpenter's pencil 100 when the proximal component 10 is properly attached to the carpenter's pencil 100. The second side of end socket 12 is a solid rigid planar member that covers the second side of a carpenter's pencil 100 at the proximal end of a carpenter's pencil 100 when proximal component 10 is properly attached to the proximal end of proximal end of a carpenter's pencil 100. The second side of end socket 12 has a proximal edge, a distal edge, an imprint edge, a workpiece edge, an inner surface, and an outer surface. The imprint edge of the second side of end socket 12 is bezeled or includes an additional solid rigid planar member connected thereto that is angled 45 degrees towards the first side of end socket as depicted. The additional 45 degree planar member of the second side has a proximal edge, a distal edge, a first edge, and a second edge. This bezel or 45 degree angled section wraps around the second side of carpenter's pencil 100 in order to snap onto the second side of carpenter's pencil 100 or help grab and hold onto the second side of carpenter's pencil 100. If the carpenter's pencil 100 has an elongated octagonal shaped cross section, this bezel or 45 degree angled section wraps around onto the octagonal side between the imprint side and the second side of carpenter's pencil 100 and is adjacent to the octagonal side between the imprint side and the second side of carpenter's pencil 100 when the proximal component 10 is properly attached to the carpenter's pencil 100.

The first edge of the proximal end of end socket 12 is connected to and contiguous with the proximal edge of the first side of end socket 12 wherein these solid rigid planar members essentially meet and connect at a right angle. The workpiece edge of the proximal end of end socket 12 is connected to and contiguous with the proximal edge of the workpiece side of end socket 12 wherein these solid rigid planar members essentially meet and connect at a right angle. The second edge of the proximal end of end socket 12 is connected to and contiguous with the proximal edge of the second side of end socket 12 wherein these solid rigid planar members essentially meet and connect at a right angle. The first edge of the workpiece side of end socket 12 is connected to and contiguous with the workpiece edge of the first side of end socket 12 wherein these solid rigid planar members essentially meet and connect at a right angle. The second edge of the workpiece side of end socket 12 is connected to and contiguous with the workpiece edge of the second side of end socket 12 wherein these solid rigid planar members essentially meet and connect at a right angle. The first edge of the additional 45 degree planar member of the first side is connected to and contiguous with the imprint edge of the first side of end socket 12 wherein these solid rigid planar members essentially meet and connect at a 45 degree angle. The proximal edge of the additional 45 degree planar member of the first side is connected to and contiguous with the distal surface of the proximal end of end socket 12 wherein these solid rigid planar members essentially meet and connect at a right angle. The second edge of the additional 45 degree planar member of the second side is connected to and contiguous with the imprint edge of the second side of end socket 12 wherein these solid rigid planar members essentially meet and connect at a 45 degree angle. The proximal edge of the additional 45 degree planar member of the second side is connected to and contiguous with the distal surface of the proximal end of end socket 12 wherein these solid rigid planar members essentially meet and connect at a right angle. The imprint side of the proximal end of end socket is not connected to anything because the imprint side of end socket 12 is open as stated above. The preceding connections between the proximal end, the imprint side, the first side, and the second side of end socket 12 form the rigid cup-shaped member, concave-shaped member, or socket-shaped member that is the end socket 12. Thus, end socket 12 is a six-sided structure, socket, or pocket made up of the proximal end, the workpiece side, the first side, the additional 45 degree planar member of the first side, the second side, the additional 45 degree planar member of the second side as depicted. As stated, end socket 12 is sized and shaped to make a press fit or slip fit onto the unsharpened proximal end of a carpenter's pencil 100.

First tab 14 on proximal component 10 is a solid rigid rectangular cuboid member located on the first side of end socket 12. First tab 14 on proximal component 10 has a width of about 0.2-0.5 inches, a thickness of about 0.05-0.4 inches, and height of about 0.05-0.5 inches. First tab 14 on proximal component 10 protrudes outward from the outer surface of the first side of end socket 12 at about a right angle from the outer surface of the first side of end socket 12. First tab 14 on proximal component 10 has a proximal surface, a distal surface, an imprint edge, a workpiece edge, a first edge, and a second edge. The first edge of first tab 14 on proximal component 10 is the edge that protrudes most outward from the outer surface of the first side of end socket 12 and is the farthest distance from the outer surface of the first side of end socket 12. The second edge of first tab 14 on proximal component 10 is the edge adjacent to the outer surface of the first side of end socket 12. The second edge of first tab 14 on proximal component 10 is connected to and contiguous with the outer surface of the first side of end socket 12. The proximal surface of first tab 14 on proximal component 10 is flush with the proximal surface of the proximal end of end socket 12. Thus, first tab 14 on proximal component 10 is located at the proximal edge of the first side of end socket 12.

Figure 8:
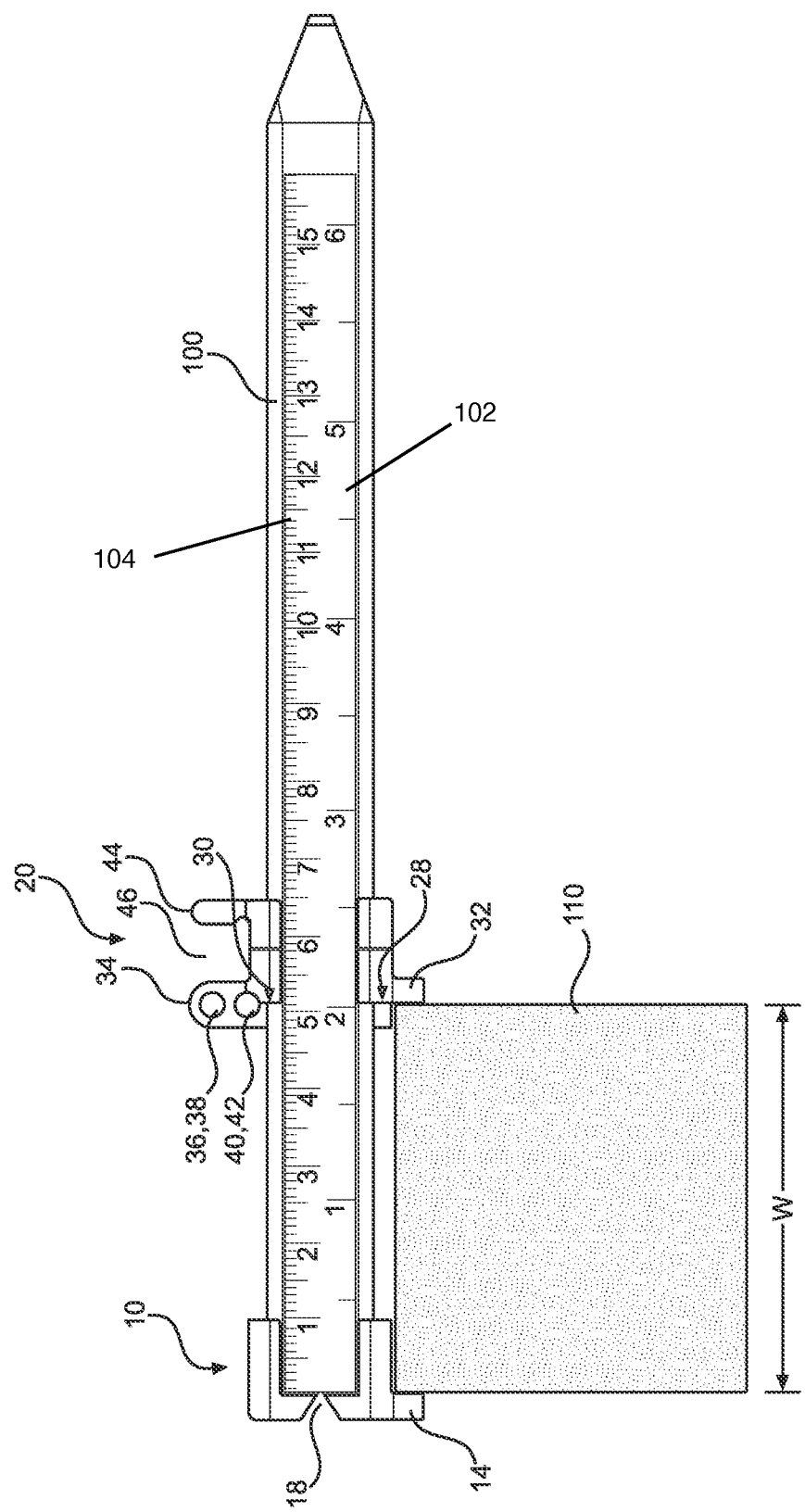
FIG. 8 is a view of carpenter pencil caliper attached to a carpenter's pencil being used to measure an outside dimension, width, or thickness of a workpiece.
Figure 9:
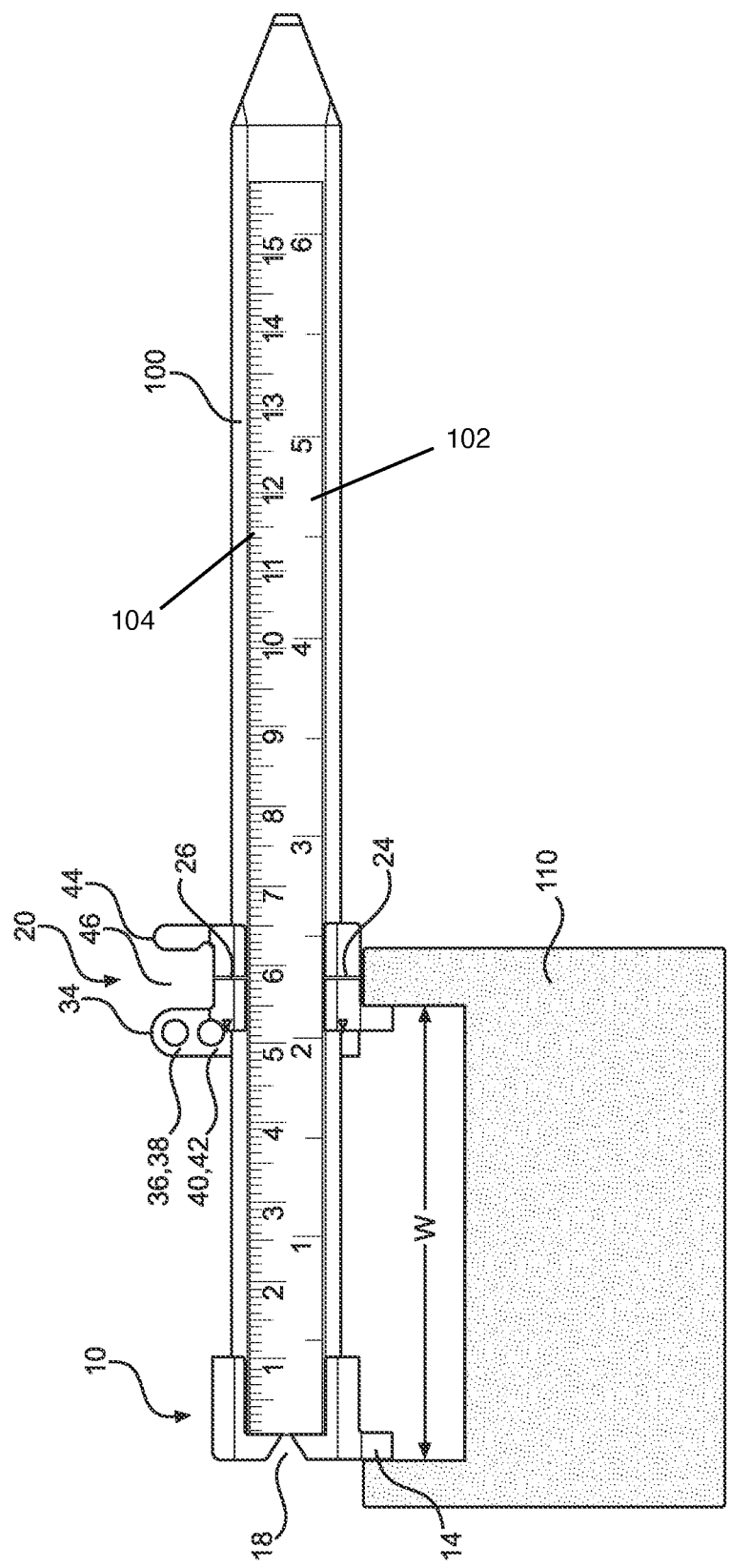
FIG. 9 is a view of carpenter pencil caliper attached to a carpenter's pencil being used to measure an inside dimension or inside gap of a workpiece.
Figure 10:
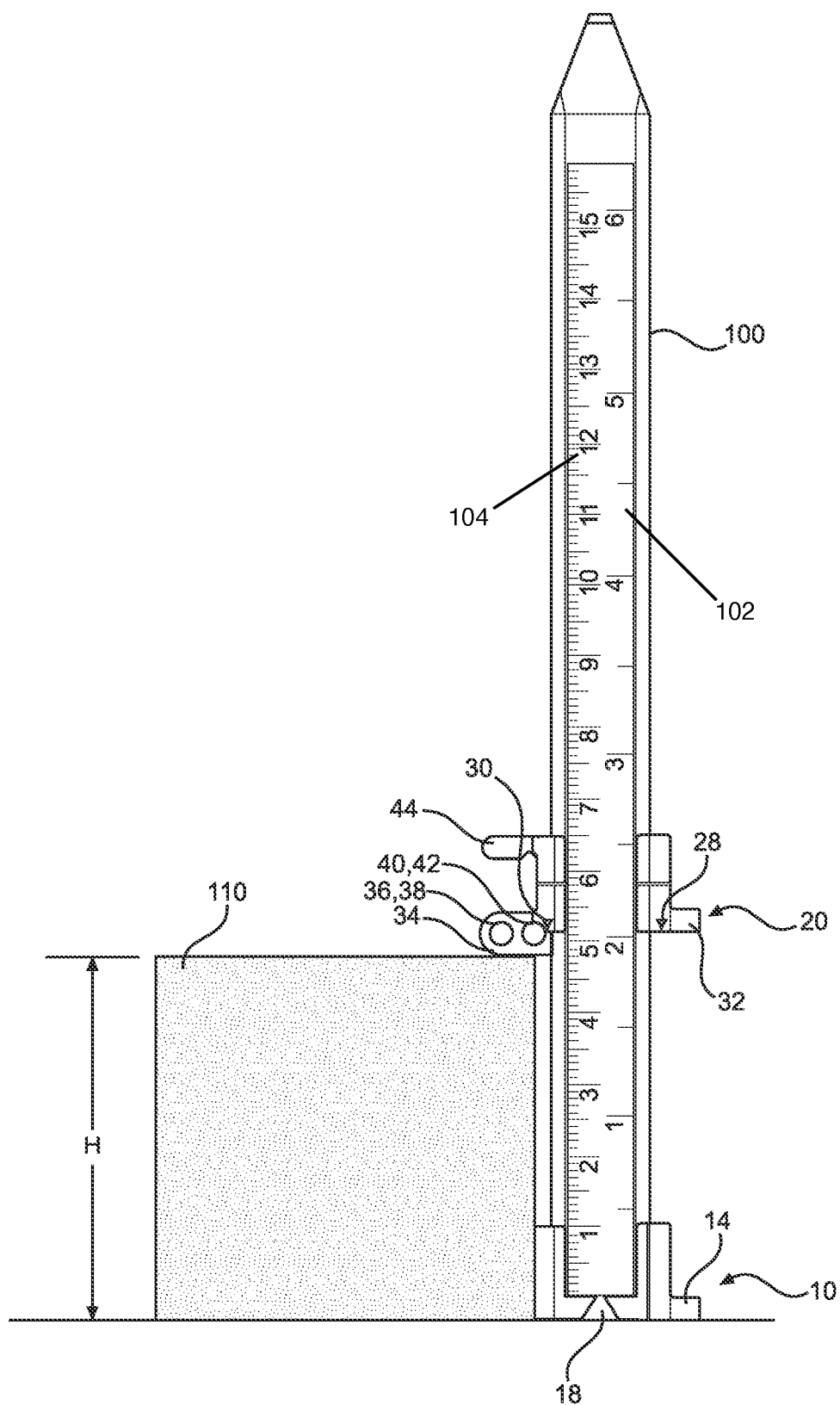
FIG. 10 is a view of carpenter pencil caliper attached to a carpenter's pencil being used to measure the height of a workpiece.

First tab 14 on proximal component 10 functions to provide a stop, catch, or indicator used to measure the outside dimension or a width of a workpiece 110, the inside dimension or a gap of a workpiece 110, and/or the height of a workpiece 110. The distal surface of first tab 14 on proximal component 10 is used to rest on or butt up against an outside surface of the workpiece 110 in order to measure an overall outside dimension, width, or thickness of a workpiece 110, as depicted in FIG. 8. The proximal surface of first tab 14 on proximal component 10 is used to rest on or butt up against an inner surface of a workpiece 110 in order to measure an inside dimension or gap of a workpiece 110, as depicted in FIG. 9. The proximal surface of first tab 14 on proximal component 10 is used to rest on or butt up against the workbench surface, support surface, or ground surface in order to measure the height of a workpiece 110, as depicted in FIG. 10.

Second tab 16 on proximal component 10 is a solid rigid rectangular cuboid member located on the workpiece side of end socket 12. Second tab 16 on proximal component 10 has a width of about 0.4-0.9 inches, a thickness of about 0.05-0.4 inches, and height of about 0.05-0.5 inches. Second tab 16 on proximal component 10 protrudes outward from the outer surface of the workpiece side of end socket 12 at about a right angle from the outer surface of the workpiece side of end socket 12. Second tab 16 on proximal component 10 has a proximal surface, a distal surface, an imprint edge, a workpiece edge, a first edge, and a second edge. The first edge of second tab 16 on proximal component 10 is the edge that is adjacent to the first tab 16 on proximal component 10. The second edge of second tab on proximal component 10 is the edge that is farthest from the first tab 16 on proximal component 10. The imprint edge of second tab 16 on proximal component 10 is connected to and contiguous with the outer surface of the workpiece side of end socket 12. The proximal surface of second tab 16 on proximal component 10 is flush with the proximal surface of the proximal end of end socket 12. Thus, second tab 16 on proximal component 10 is located at the proximal edge of the workpiece side of end socket 12.

Second tab 16 on proximal component 10 functions to provide a stop, catch, or indicator used to measure for a mark line or a scribe line 120 on a workpiece 110. The distal surface of second tab 16 on proximal component 10 is used to rest on or butt up against the side of a workpiece 110 in order to measure for and create a scribe line or score line or mark line on a workpiece 110 as depicted in FIGS. 11-16. The proximal surface of second tab 16 on proximal component 10 is used to rest on or butt up again the workbench surface, support surface, or ground surface in order to measure the height of a workpiece 110, as depicted in FIG. 10. The proximal surfaces of first and second tabs 14, 16 are flush with each other and flush with that of proximal end of end socket 12.

Proximal component 10 may further comprise: a pivot notch 18. Pivot notch 18 is a V-shaped groove, depression, or notch in the proximal surface of the proximal end of end socket 12. Pivot notch 18 is linear or straight and runs parallel to the first and second sides of end socket 12. Pivot notch 18 extends all the way across the first side of end socket 12. Pivot notch 18 runs from the imprint edge of the first side of end socket 12 to the workpiece edge of the second tab 16, as depicted. Pivot notch 18 has a width of about 0.125 to 0.4 inches at the top of the V-shape. Pivot notch 18 extends all the way through the proximal end of end socket 12 yield a break out slit in the distal surfaces of the proximal end of end socket 12 and second tab 16 as depicted.

Figure 17:
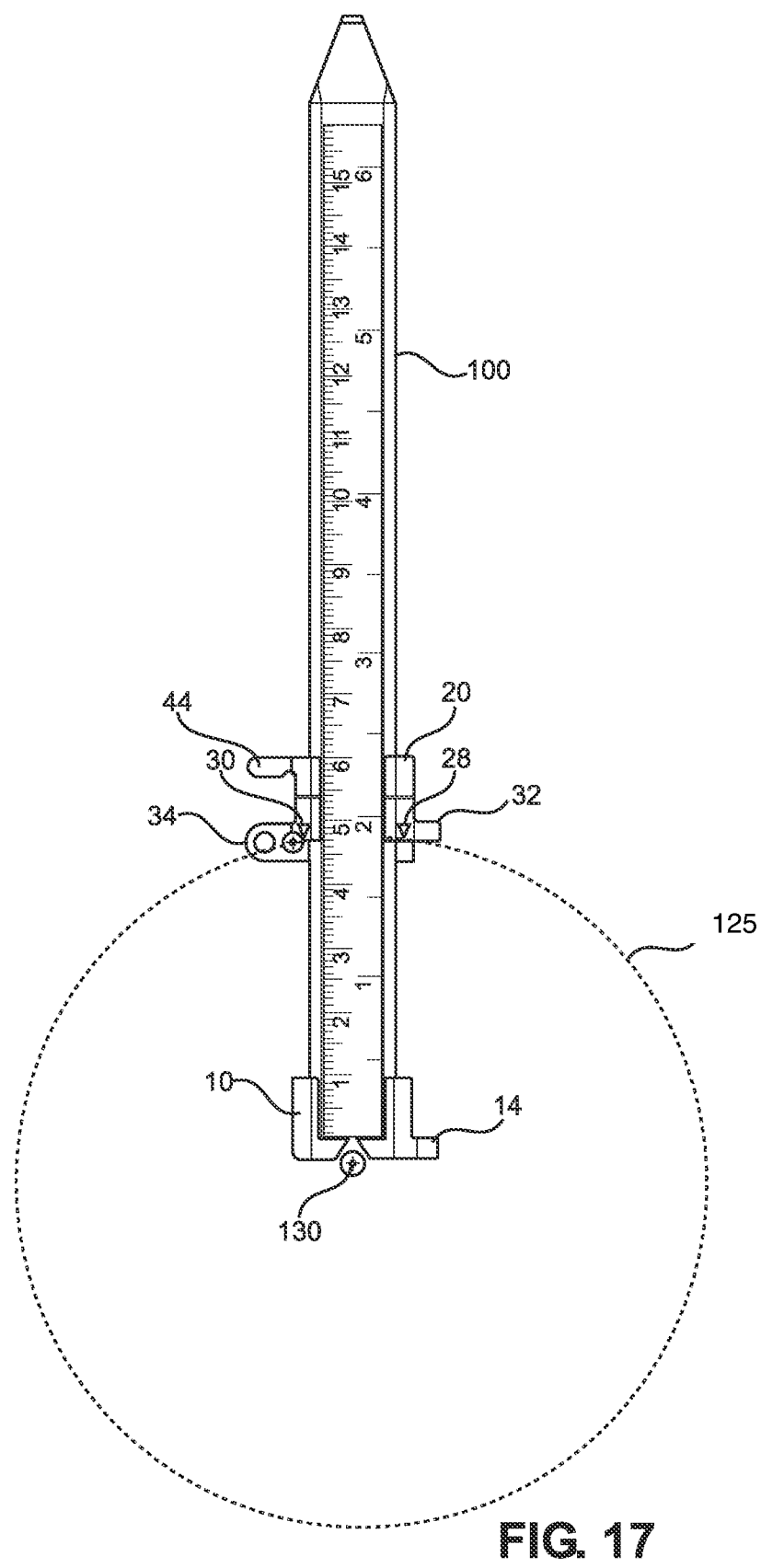
FIG. 17 is a top plan view of carpenter pencil caliper attached to a carpenter's pencil being used to mark a precisely sized circle at an exact location on a work piece.
Figure 18:
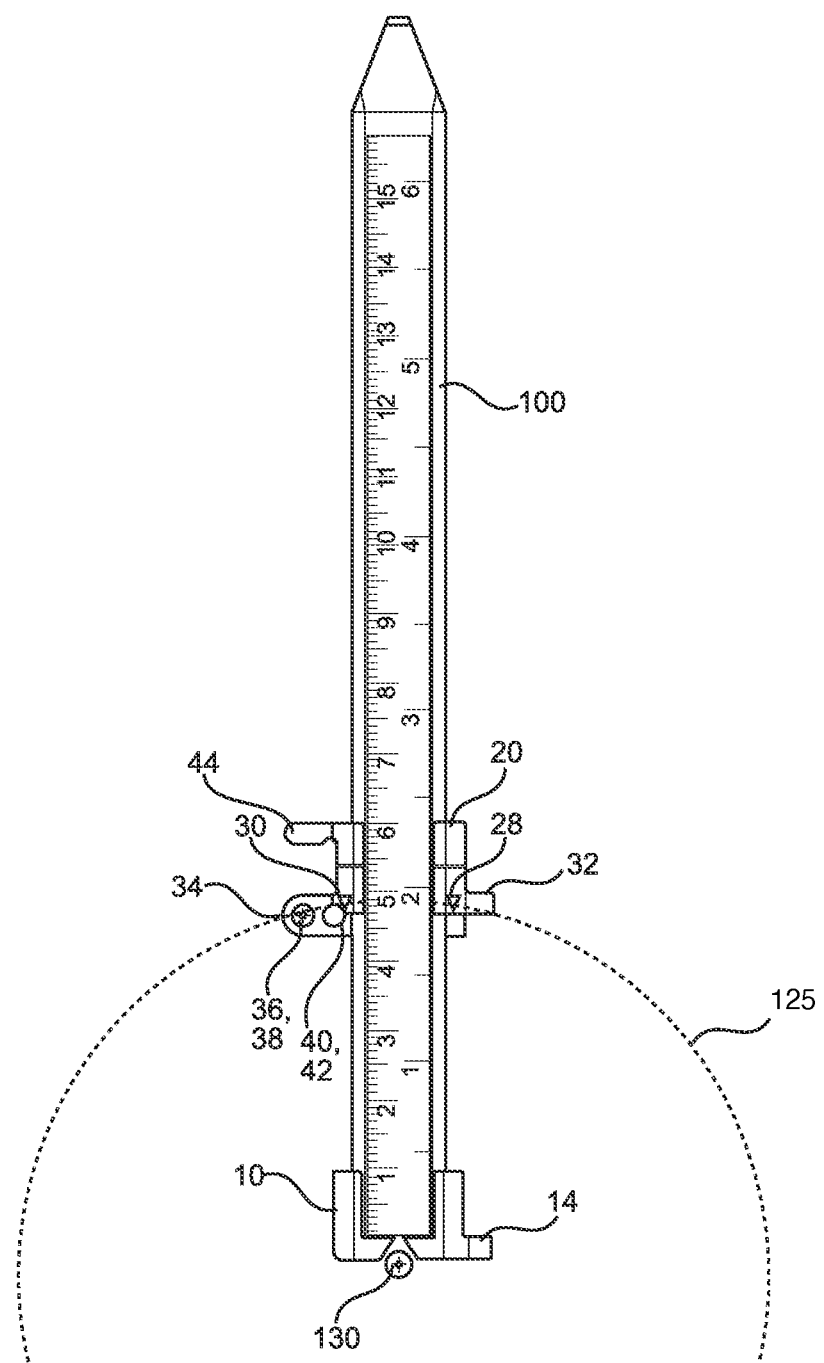
FIG. 18 is a top plan view of carpenter pencil caliper attached to a carpenter's pencil being used to scribe a precisely sized circle at an exact location on a work piece.
Figure 19:
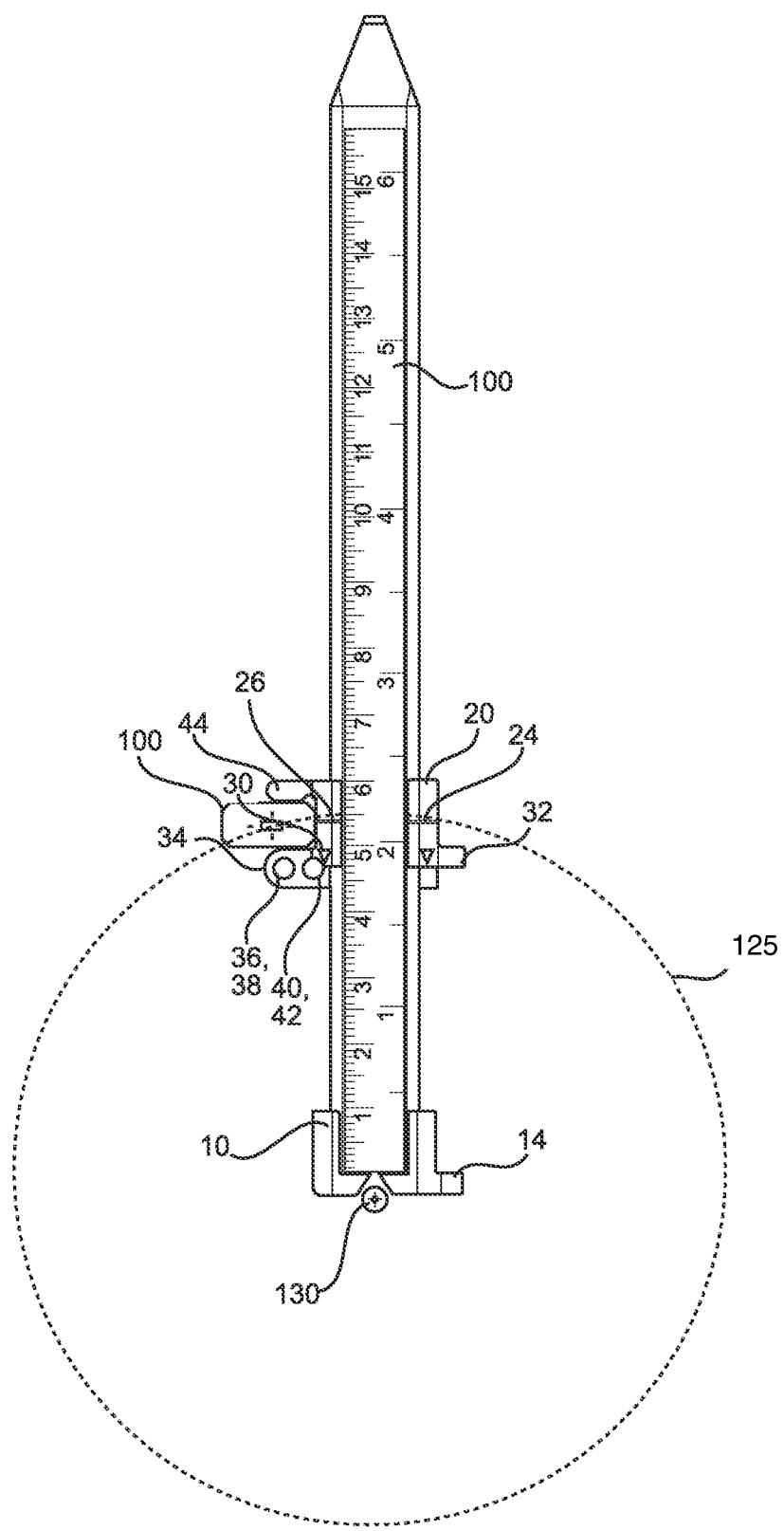
FIG. 19 is a top plan view of carpenter pencil caliper attached to a carpenter's pencil, along with a second carpenter's pencil inserted into a pencil cradle on the distal component, all being used to mark a precisely sized circle with the second carpenter's pencil at an exact location on a work piece.

Pivot notch 18 functions to provide a nesting area for a screw or nail 130 and to use the screw or nail 130 as a stationary pivot point from which to use a carpenter pencil caliper 5 to mark or scribe a circle 125 onto a workpiece 110, as depicted in FIGS. 17-19. A screw or nail 130 is inserted into the workpiece 110 at the center of the desired hole or circle, and then the pivot notch 18 on the carpenter pencil caliper 5 is positioned and pushed against the screw or nail 130 wherein the whole assembly of carpenter pencil caliper 5 and carpenter's pencil 100 is rotated around the screw or nail 130 so that the scribing tool insert 38, marking tool insert 42, or a second carpenter's pencil 100 is used to create mark circle or scribe circle 125 on a workpiece 110, as discussed below.

Proximal component 10 may be made from any know material such as plastic, wood, metal, composite, or any other material. In best mode, proximal component 10 is a one-piece structure or a unibody structure wherein all its components like end socket 12, a first tab 14, and a second tab 16 are all made from the same piece of material. In best mode, proximal component 10 is made of plastic that has been molded or 3-D printed to form the specially shaped rigid member.

Distal component 20 comprises: a mid-section socket 22; a first tab 32; a second tab 34; a third tab 44, and a carpenter's pencil cradle 46. Distal Component 20 is a specially shaped rigid member. Distal component 20 has a proximal end, a distal end, an imprint side, a workpiece side, a first side, and a second side. The proximal end of distal component 20 is the end of distal component 20 that is closest to the user when the carpenter pencil caliper 5 is being used properly. The distal end of distal component 20 is the end of distal component 20 that is farthest from the user when the carpenter pencil caliper 5 is being used properly. The distal end of distal component 20 is the end that is opposite from the proximal end of distal component 20 and vice versa. The mid-section socket 22 of distal component 20 is reversibly slidably attachable to the middle section of a carpenter's pencil 100, as described below. The imprint side of distal component 20 is the side that is adjacent and contiguous with the ruler or rule imprint on the carpenter's pencil 100 when the distal component 20 is properly attached to the carpenter's pencil 100. The workpiece side of distal component 20 is the side that opposite from the imprint side and is adjacent and contiguous with the workpiece 110 when carpenter pencil caliper 5 is being properly used. The first side of distal component 20 is the side of distal component 20 that is adjacent and contiguous with the lower scale, ruler imprint, or rule imprint 102 when carpenter pencil caliper 5 is properly attached to a carpenter's pencil 100. The lower scale, ruler imprint, or rule imprint 102 is the scale that is on the bottom of the carpenter's pencil 100 when the carpenter's pencil 100 is orientated properly so that the numbers on the scale read properly from left to right. The second side of distal component 20 is the side of distal component 20 that is adjacent and contiguous with the upper scale, ruler imprint, or rule imprint 104 when carpenter pencil caliper 5 is properly attached to a carpenter's pencil 100. The upper scale, ruler imprint, or rule imprint 104 is the scale that is on the top of the carpenter's pencil 100 when the carpenter's pencil 100 is orientated properly so that the numbers on the scale read properly from left to right.

Mid-section socket 22 is a rigid C-shaped member, concave-shaped member, or cradle-shaped member located at the workpiece side of distal component 20. Mid-section socket 22 has an inside width of about 0.2 to 0.4 inches and an inside length of about 0.4 to 0.7 inches. Mid-section socket 22 is sized and shaped to make a slip fit or a slidable attachment onto the side or length of a carpenter's pencil 100, as depicted. Mid-section socket 22 has precise inner dimensions that are dictated by the thickness and width of a standard carpenter's pencil 100. Mid-section socket 22 has a precise shape to slide onto the end of a standard carpenter's pencil 100 and slidably attach to the length of the carpenter's pencil. Mid-section socket 22 has an inner width and an inner length that are sized to make a slip fit with the thickness and the width of a standard carpenter's pencil 100, respectively. The friction forces with this arrangement must be very small or very slight in order to allow for the distal component 20 to slide back and forth along the carpenter's pencil 100 as discussed below. In order to attach the distal component 20 to a carpenter's pencil 100, distal component 20 is slid onto the middle section of carpenter's pencil 100 from either the proximal end or the distal end of the carpenter's pencil 100.

The proximal end of mid-section socket 22 is open and without any structure. The proximal end of mid-section socket 22 is open to allow for either end of the carpenter's pencil 100 to slide into. In order to attach the carpenter's pencil 100 to the distal component 20, the proximal or distal end of the carpenter's pencil 100 is inserted into the proximal or distal end of mid-section socket 22. The distal end of mid-section socket 22 is open and without any structure. The distal end of mid-section socket 22 is open to allow for either end of the carpenter's pencil 100 to slide into. In order to attach the carpenter's pencil 100 to the distal component 20, the proximal or distal end of the carpenter's pencil 100 is inserted into the proximal or distal end of mid-section socket 22. The imprint side of mid-section socket 22 is open and without any structure. The imprint side of mid-section socket 22 is an open side of C-shaped member, concave-shaped member, or cradle-shaped member. This open side or imprint side of mid-section socket 22 functions to allow the lower and upper scales, ruler imprints, or rule imprints 102, 104 to be seen and read by the user of the carpenter pencil caliper 5. The workpiece side of mid-section socket 22 is a solid rigid planar member that covers the workpiece side of carpenter's pencil 100 at the middle section of the carpenter's pencil 100 when distal component 20 is properly attached to the proximal end of a carpenter's pencil 100. The workpiece side of mid-section socket 22 has a proximal edge, a distal edge, an inner surface, an outer surface, a first edge, and a second edge. The first side of mid-section socket 22 is a solid rigid planar member that covers the first side of a carpenter's pencil 100 at the middle section of a carpenter's pencil 100 when distal component 20 is properly attached to the proximal end of proximal end of a carpenter's pencil 100. The first side of mid-section socket 22 has a proximal edge, a distal edge, an imprint edge, a workpiece edge, an inner surface, and an outer surface. The imprint edge of the first side of mid-section socket 22 is bezeled or includes an additional solid rigid planar member connected thereto that is angled 45 degrees towards the second side of end socket as depicted. The additional 45 degree planar member of the first side has a proximal edge, a distal edge, a first edge, and a second edge. This bezel or 45 degree angled section wraps around the first side of carpenter's pencil 100 in order to snap onto the first side of carpenter's pencil 100 or help grab and hold onto the first side of carpenter's pencil 100. If the carpenter's pencil 100 has an elongated octagonal shaped cross section, this bezel or 45 degree angled section wraps around the octagonal side between the imprint side and the first side of carpenter's pencil 100 and is adjacent to the octagonal side between the imprint side and the first side of carpenter's pencil 100 when the distal component 20 is properly attached to the carpenter's pencil 100. The second side of mid-section socket 22 is a solid rigid planar member that covers the second side of a carpenter's pencil 100 at the proximal end of a carpenter's pencil 100 when distal component 20 is properly attached to the proximal end of proximal end of a carpenter's pencil 100. The second side of mid-section socket 22 has a proximal edge, a distal edge, an imprint edge, a workpiece edge, an inner surface, and an outer surface. The imprint edge of the second side of mid-section socket 22 is bezeled or includes an additional solid rigid planar member connected thereto that is angled 45 degrees towards the first side of end socket as depicted. The additional 45 degree planar member of the second side has a proximal edge, a distal edge, a first edge, and a second edge. This bezel or 45 degree angled section wraps around the second side of carpenter's pencil 100 in order to snap onto the second side of carpenter's pencil 100 or help grab and hold onto the second side of carpenter's pencil 100. If the carpenter's pencil 100 has an elongated octagonal shaped cross section, this bezel or 45 degree angled section wraps around onto the octagonal side between the imprint side and the second side of carpenter's pencil 100 and is adjacent to the octagonal side between the imprint side and the second side of carpenter's pencil 100 when the distal component 20 is properly attached to the carpenter's pencil 100.

The first edge of the workpiece side of mid-section socket 22 is connected to and contiguous with the workpiece edge of the first side of mid-section socket 22 wherein these solid rigid planar members essentially meet and connect at a right angle. The second edge of the workpiece side of mid-section socket 22 is connected to and contiguous with the workpiece edge of the second side of mid-section socket 22 wherein these solid rigid planar members essentially meet and connect at a right angle. The first edge of the additional 45 degree planar member of the first side is connected to and contiguous with the imprint edge of the first side of mid-section socket 22 wherein these solid rigid planar members essentially meet and connect at a 45 degree angle. The second edge of the additional 45 degree planar member of the second side is connected to and contiguous with the imprint edge of the second side of mid-section socket 22 wherein these solid rigid planar members essentially meet and connect at a 45 degree angle. The preceding connections between the workpiece side, the first side, and the second side of mid-section socket 22 form the rigid C-shaped member, concave-shaped member, or cradle-shaped member that is the mid-section socket 22. Thus, mid-section socket 22 is a five-sided structure made up of the workpiece side, the first side, the additional 45 degree planar member of the first side, the second side, the additional 45 degree planar member of the second side as depicted. As stated, mid-section socket 22 is sized and shaped to reversibly slidably attach to the middle section of a carpenter's pencil 100.

First tab 32 on distal component 20 is a solid rigid rectangular cuboid member located on the first side of mid-section socket 22. First tab 32 on distal component 20 has a width of about 0.2-0.5 inches, a thickness of about 0.05-0.4 inches, and height of about 0.05-0.5 inches. First tab 32 on distal component 20 protrudes outward from the outer surface of the first side of mid-section socket 22 at about a right angle from the outer surface of the first side of mid-section socket 22. First tab 32 on distal component 20 has a proximal surface, a distal surface, an imprint edge, a workpiece edge, a first edge, and a second edge. The first edge of first tab 32 on distal component 20 is the edge that protrudes most outward from the outer surface of the first side of mid-section socket 22 and is the farthest distance from the outer surface of the first side of mid-section socket 22. The second edge of first tab 32 on distal component 20 is the edge adjacent to the outer surface of the first side of mid-section socket 22. The second edge of first tab 32 on distal component 20 is connected to and contiguous with the outer surface of the first side of mid-section socket 22.

First tab 32 on distal component 20 functions to provide a stop, catch, or indicator used to measure the outside dimension or a width of a workpiece 110 or the inside dimension or a gap of a workpiece 110. The proximal surface of first tab 32 on distal component 20 is used to rest on or butt up against an outside surface of the workpiece 110 in order to measure an overall outside dimension, width, or thickness of a workpiece 110, as depicted in FIG. 8. The first arrow indicator 28 and/or the second arrow indicator 30 are used in order to take this measurement. Thus, when the carpenter pencil caliper 5 is being used properly, the first arrow indicator 28 and the second arrow indicator 30 point to the overall outside dimension, width, or thickness of a workpiece 110 on the lower scale, ruler, or rule imprint 102 and the upper scale, ruler, or rule imprint 104 respectively.

The distal surface of first tab 32 on distal component 20 is used to rest on or butt up against an inner surface of a workpiece 110 in order to measure an inside dimension or gap of a workpiece 110, as depicted in FIG. 9. The first graduation line 24 and/or the second graduation line 26 are used in order to take this measurement. Thus, when the carpenter pencil caliper 5 is being used properly, the first graduation line 24 and the second graduation line 26 point to the inside dimension or gap of a workpiece 110 on the lower scale, ruler, or rule imprint 102 and the upper scale, ruler, or rule imprint 104 respectively.

Second tab 34 on distal component 20 is a solid rigid rectangular cuboid member located on the second side of mid-section socket 22. Second tab 34 on distal component 20 has a width of about 0.4-0.9 inches, a thickness of about 0.05-0.4 inches, and height of about 0.05-0.5 inches. Second tab 34 on distal component 20 protrudes outward from the outer surface of the second side of mid-section socket 22 at about a right angle from the outer surface of the second side of mid-section socket 22. Second tab 34 on distal component 20 has a proximal surface, a distal surface, an imprint surface, a workpiece surface, a first edge, and a second edge.

The first edge of second tab 34 on distal component 20 is connected to and contiguous with the outer surface of the second side of mid-section socket 22. The second edge of second tab 34 on proximal component 10 is the edge that is farthest from the outer surface of the second side of mid-section socket 22. Second tab 34 on distal component 20 has a scribe socket 36 and a marking socket 40 located therein. Scribe socket 36 is a cylindrical hole running from the imprint surface to the workpiece surface of the second tab 34 on distal component 20. Scribe socket 36 runs all the way through second tab 34 on distal component 20. Scribe socket 36 has a longitudinal axis that is perpendicular to the imprint surface and the workpiece surface of the second tab 34 on distal component 20. Scribe socket 36 has an inner diameter that is sized to make a press fit or slip fit with the outside diameter of a scribing tool insert 38. Scribing tool insert 38 is a solid rigid cylindrical member with a sharp point at one end that is used to scratch into or scribe into a workpiece in order to leave a visible mark on the workpiece 110. Scribe socket 36 functions to receive and hold a scribing tool insert 38 that is used to scribe a mark line or scribe line 120 a mark circle or scribe circle 125 on a workpiece 110. Marking socket 40 is a cylindrical hole running from the imprint surface to the workpiece surface of the second tab 34 on distal component 20. Marking socket 40 runs all the way through second tab 34 on distal component 20. Marking socket 40 has a longitudinal axis that is perpendicular to the imprint surface and the workpiece surface of the second tab 34 on distal component 20. Marking socket 40 has an inner diameter that is sized to make a press fit or slip fit with the outside diameter of a marking tool insert 42. Marking tool insert 42 is a solid rigid cylindrical member with a point at one end that is used to mark a workpiece 110 in order to leave a visible mark on the workpiece 110. Marking tool insert 42 must be made of a material that leaves a mark or rubs off such as pencil lead, graphite, soapstone, etc. Marking socket 40 functions to receive and hold the marking tool insert 42 that is used to mark a mark line or scribe line 120 or a mark circle or scribe circle 125 on a workpiece 110. The second edge of second tab 34 on distal component 20 may be rounded as depicted. The proximal surface of second tab 34 on distal component 20 is flush with the proximal surface of the proximal end of mid-section socket 22. Thus, second tab 34 on distal component 20 is located at the proximal edge of the first side of mid-section socket 22.

Second tab 34 on distal component 20 functions to provide a stop, catch, or indicator used to measure the height of a workpiece 110. The proximal surface of second tab 34 on distal component 20 is used to rest on or butt up against the surface or top of a workpiece 110 in order to measure the height of a workpiece 110, as depicted in FIG. 10. The first arrow indicator 28 and/or the second arrow indicator 30 are used in order to take this measurement. Thus, when the carpenter pencil caliper 5 is being used properly, the first arrow indicator 28 and the second arrow indicator 30 point to the height of a workpiece 110 on the lower scale, ruler, or rule imprint 102 and the upper scale, ruler, or rule imprint 104 respectively.

Figure 11:
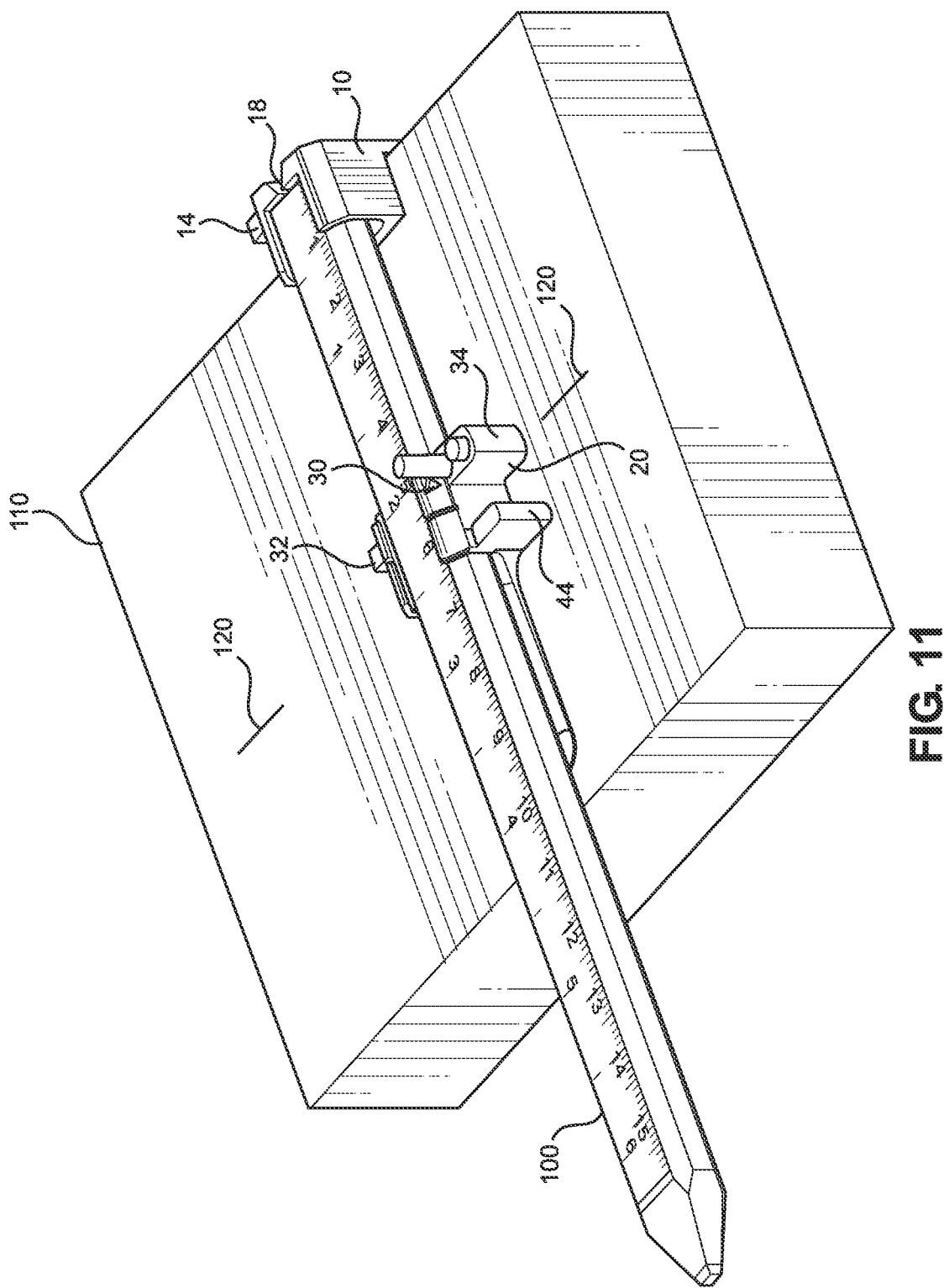
FIG. 11 is a view of carpenter pencil caliper attached to a carpenter's pencil being used to mark or scribe a straight line at an exact location on a work piece.
Figure 12:
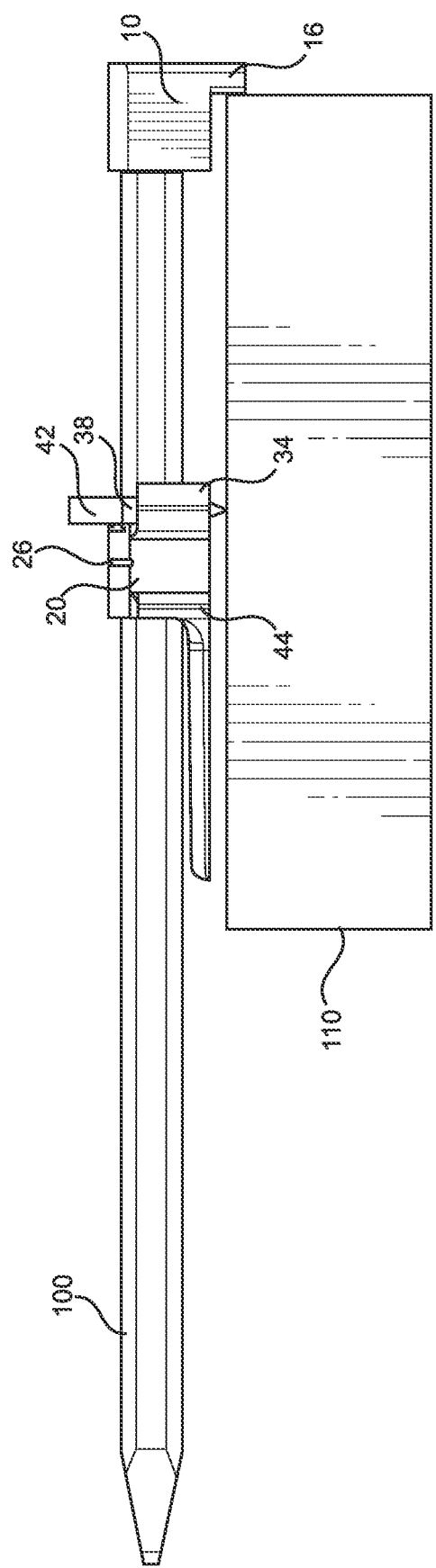
FIG. 12 is a right side elevation view of carpenter pencil caliper attached to a carpenter's pencil being used to mark or scribe a straight line at an exact location on a work piece.
Figure 13:
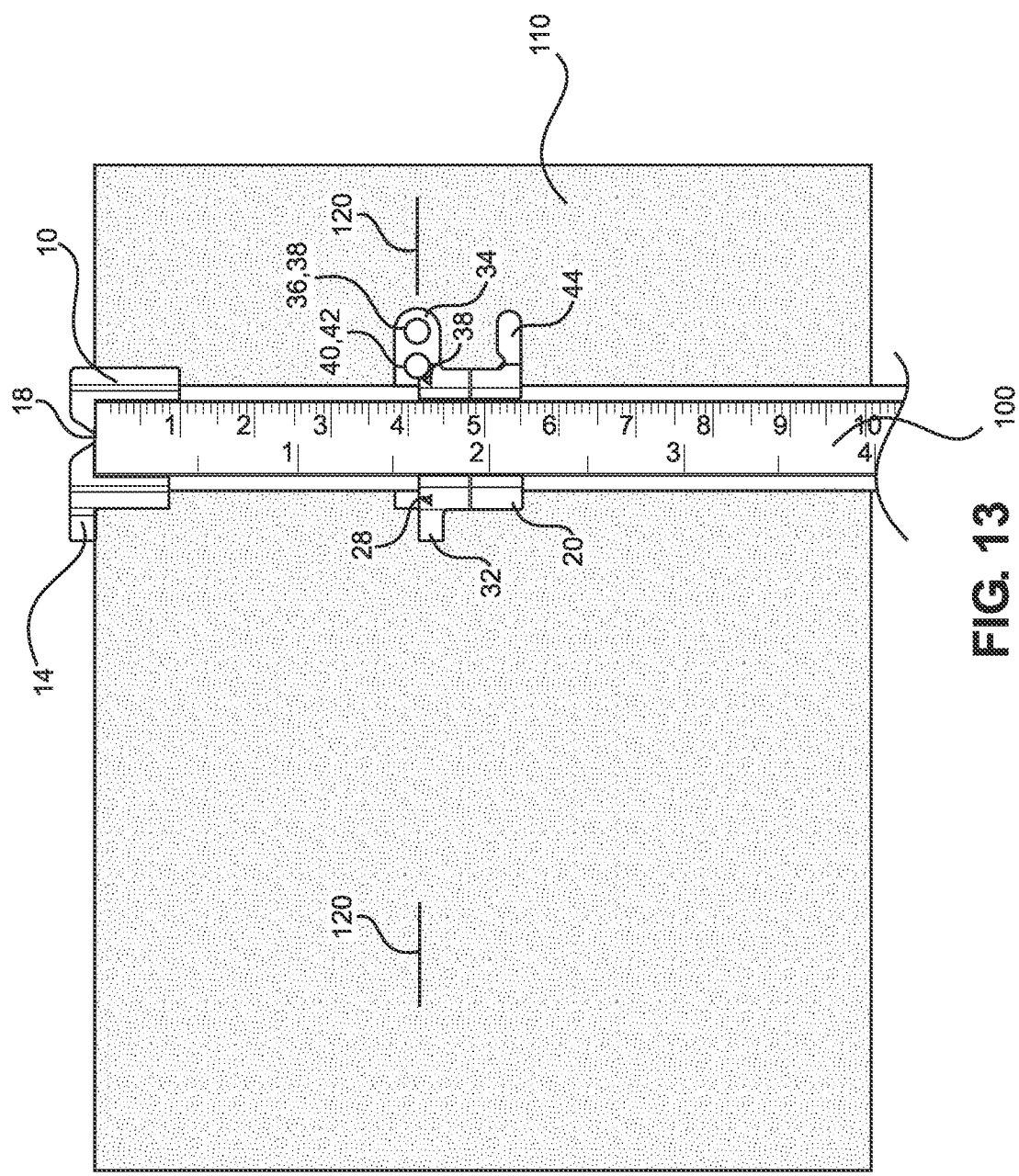
FIG. 13 is a top plan view of carpenter pencil caliper attached to a carpenter's pencil being used to mark or scribe a straight line at an exact location on a work piece.
Figure 14:
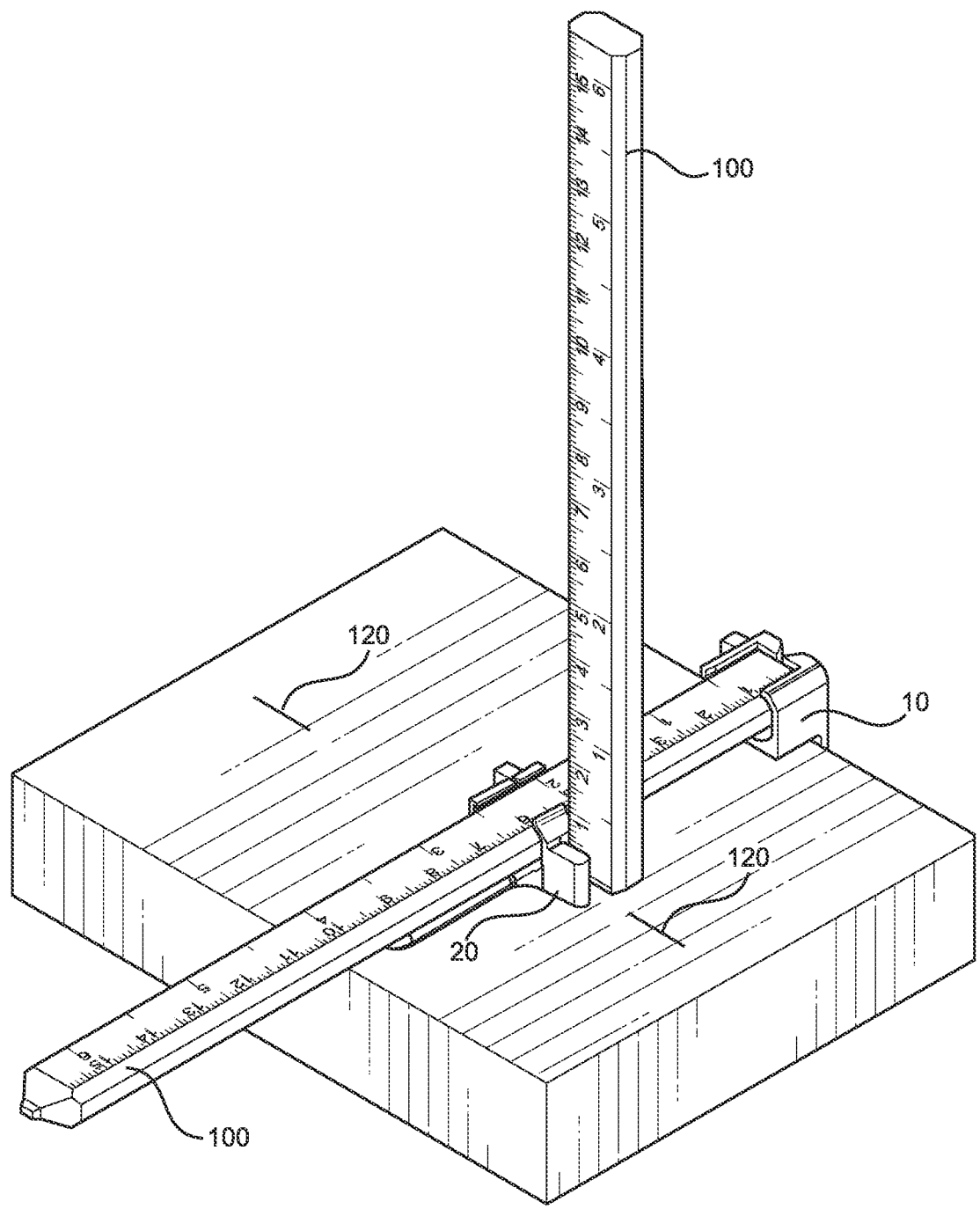
FIG. 14 is a view of carpenter pencil caliper attached to a carpenter's pencil, along with a second carpenter's pencil inserted into a pencil cradle on the distal component, all being used to mark a straight line with the second carpenter's pencil at an exact location on a work piece.
Figure 15:
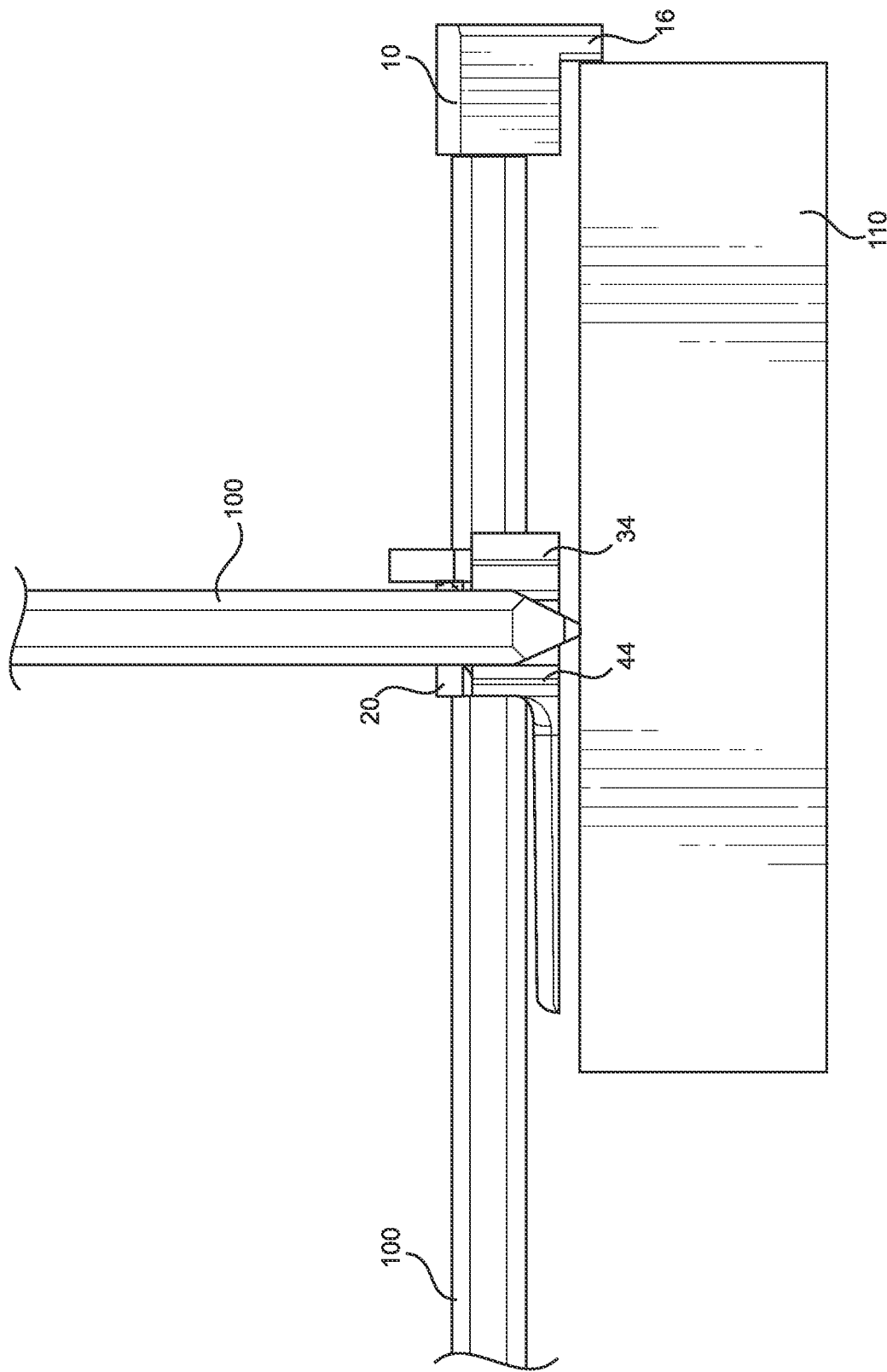
FIG. 15 is a right side elevation view of carpenter pencil caliper attached to a carpenter's pencil, along with a second carpenter's pencil inserted into a pencil cradle on the distal component, all being used to mark a straight line with the second carpenter's pencil at an exact location on a work piece.
Figure 16:
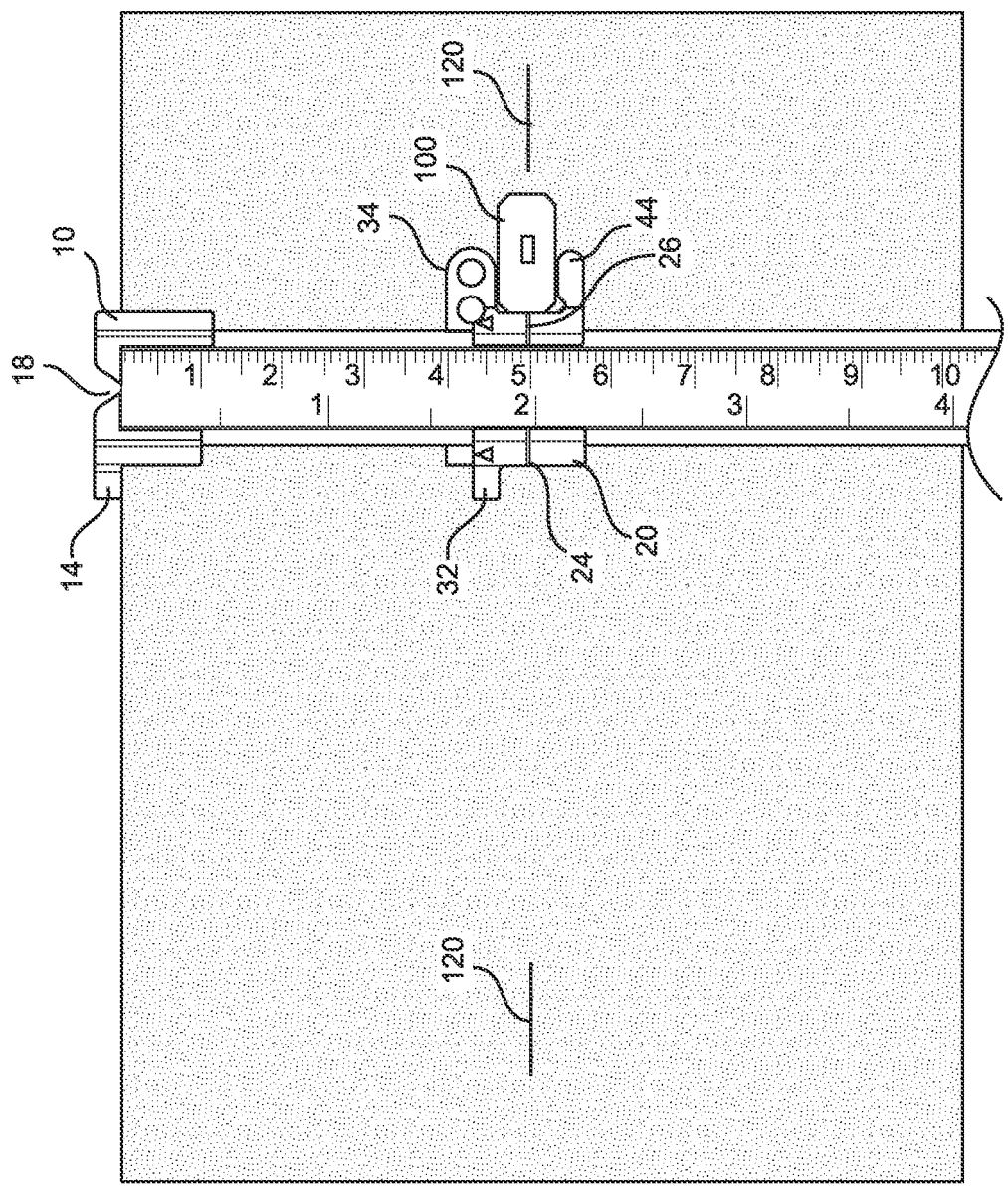
FIG. 16 is a top plan view of carpenter pencil caliper attached to a carpenter's pencil, along with a second carpenter's pencil inserted into a pencil cradle on the distal component, all being used to mark a straight line with the second carpenter's pencil at an exact location on a work piece.

Second tab 34 on distal component 20 also functions to receive and hold the scribing tool insert 38 and the marking tool insert 42. The scribing tool insert 38 and the marking tool insert 42 can be used to scribe or mark a line on a workpiece 110 at an exact and measured location as depicted in FIGS. 11-13. The scribing tool insert 38 and the marking tool insert 42 can also be used to scribe or mark a circle 125 on a workpiece 110 at an exact and measured location as depicted in FIGS. 17-18.

Third tab 44 on distal component 20 is a solid rigid rectangular cuboid member located on the second side of mid-section socket 22. Third tab 44 on distal component 20 has a width of about 0.4-0.9 inches, a thickness of about 0.05-0.4 inches, and height of about 0.05-0.5 inches. Third tab 44 on distal component 20 protrudes outward from the outer surface of the second side of mid-section socket 22 at about a right angle from the outer surface of the second side of mid-section socket 22. Third tab 44 on distal component 20 has a proximal surface, a distal surface, an imprint edge, a workpiece edge, a first edge, and a second edge.

The first edge of third tab 44 on distal component 20 is connected to and contiguous with the outer surface of the second side of mid-section socket 22. The second edge of third tab 44 on proximal component 10 is the edge that is farthest from the outer surface of the second side of mid-section socket 22. Third tab 44 on distal component 20 is located on the distal side of second tab 34 on distal component 20 as depicted. The distance between the distal surface on the second tab 34 on distal component 20 and the proximal surface of the third tab 44 on distal component 20 is about 0.25 inches. The distance between the distal surface on the second tab 34 on distal component 20 and the proximal surface of the third tab 44 on distal component 20 is sized to make a press fit or slip fit with the thickness of a carpenter's pencil 100. The space between the second and third tabs 34, 44 on mid-section socket 22 form a carpenter's pencil cradle 46.

Carpenter's pencil cradle 46 is a groove, notch, nest, or cradle defined by the distal surface on the second tab 34 on distal component 20 and the proximal surface of the third tab 44 on distal component 20. The distance between these surfaces is 0.2 to 0.4 inches. The distance between these surfaces is dictated by the thickness and width of a standard carpenter's pencil 100. The distance between these surfaces is sized to make a press fit or slip fit with the side or thickness of a standard carpenter's pencil 100. Carpenter's pencil cradle 46 functions to receive and hold a second carpenter's pencil 100 that is used to mark a line 120 or circle 125 on a workpiece 110 as depicted in FIGS. 14-16 and 19. Carpenter's pencil cradle 46 provides another option to use a second carpenter's pencil besides the scribing tool insert 38 and the marking tool insert 42 in order to mark a line or a circle on a workpiece.

Distal component 20 may further comprise a first graduation line 24. First graduation line 24 is a line on the outer surface of the additional 45 degree planar member of the first side of mid-section socket 22. The line of first graduation line 24 runs perpendicular to the first and second edges of the additional 45 degree planar member of the first side of mid-section socket 22 and parallel with the proximal and distal edges of the additional 45 degree planar member of the first side of mid-section socket 22. First graduation line 24 runs across the whole outer surface of the additional 45 degree planar member of the first side of mid-section socket 22 as depicted. First graduation line 24 functions as an indicator to read the lower scale, ruler, or rule imprint 102 on carpenter's pencil 100 when measuring an inside dimension or an inside gap measurement of a workpiece 110 as depicted in FIG. 9. First graduation line 24 also functions as an indicator to read the lower scale, ruler, or rule imprint 102 on carpenter's pencil 100 when a second carpenter's pencil 100 is placed into the carpenter's pencil cradle 46 and used to mark a workpiece 110, as depicted in FIGS. 14-16 and 19.

Distal component 20 may further comprise a second graduation line 26. Second graduation line 26 is a line on the outer surface of the additional 45 degree planar member of the second side of mid-section socket 22. The line of second graduation line 26 runs perpendicular to the first and second edges of the additional 45 degree planar member of the second side of mid-section socket 22 and parallel with the proximal and distal edges of the additional 45 degree planar member of the second side of mid-section socket 22. Second graduation line 26 runs across the whole outer surface of the additional 45 degree planar member of the second side of mid-section socket 22 as depicted. Second graduation line 26 functions as an indicator to read the upper scale, ruler, or rule imprint 104 on carpenter's pencil 100 when measuring an inside dimension or an inside gap measurement of a workpiece 110 as depicted in FIG. 9. Second graduation line 26 also functions as an indicator to read the upper scale, ruler, or rule imprint 104 on carpenter's pencil 100 when a second carpenter's pencil 100 is placed into the carpenter's pencil cradle 46 and used to mark a workpiece 110, as depicted in FIGS. 14-16 and 19.

Distal component 20 may further comprise a first arrow indicator 28. First arrow indicator 28 is an arrow or triangle shape on the outer surface of the additional 45 degree planar member of the first side of mid-section socket 22. First arrow indicator 28 is an arrow or triangle shape with a point or a tip. First arrow indicator 28 is located on the proximal edge the additional 45 degree planar member of the first side of mid-section socket 22. The point or tip of first arrow indicator 28 is adjacent to the proximal edge the additional 45 degree planar member of the first side of mid-section socket 22. The point or tip of first arrow indicator 28 points towards the proximal end of mid-section socket 22 as depicted. First arrow indicator 28 functions as an indicator to read the lower scale, ruler, or rule imprint 102 on carpenter's pencil 100 when measuring an outside dimension or an overall outer dimension of a workpiece 110 and/or a height of a workpiece 110, as depicted in FIGS. 8 and 10, or scribing a workpiece as depicted in FIGS. 13 and 17.

Distal component 20 may further comprise a second arrow indicator 30. Second arrow indicator 30 is an arrow or triangle shape on the outer surface of the additional 45 degree planar member of the second side of mid-section socket 22. Second arrow indicator 30 is an arrow or triangle shape with a point or a tip. Second arrow indicator 30 is located on the proximal edge the additional 45 degree planar member of the second side of mid-section socket 22. The point or tip of second arrow indicator 30 is adjacent to the proximal edge the additional 45 degree planar member of the second side of mid-section socket 22. The point or tip of second arrow indicator 30 points towards the proximal end of mid-section socket 22 as depicted. Second arrow indicator 30 functions as an indicator to read the upper scale, ruler, or rule imprint 104 on carpenter's pencil 100 when measuring an outside dimension or an overall outer dimension of a workpiece 110 and/or a height of a workpiece 110 as depicted in FIGS. 8 and 10, or scribing a workpiece as depicted in FIGS. 13 and 17.

Distal component 20 may further comprise a pocket clip 48. Pocket clip 48 is an oblong member that extends from the distal surface of the mid-section socket 22 on distal component 20. Pocket clip 48 has a proximal end, a distal end, an imprint surface, a workpiece surface, a first edge, and a second edge. The proximal end of pocket clip 48 is connected to and contiguous with the distal end of mid-section socket 22. Pocket clip 48 has a longitudinal axis that extends perpendicular outward from the distal end of mid-section socket 22. Pocket clip 48 has a length of about 0.5-2.0 inches. Pocket clip 48 functions to provide a clip or a bracket to hold the carpenter pencil caliper 5 and the attached carpenter's pencil 100 inside of the user's shirt pocket or other pocket. The distal ends of the carpenter pencil caliper 5 and the attached carpenter's pencil 100 are inserted into the user's pocket and then the pocket clip 48 is clipped onto the user's pocket in order to secure and hold the carpenter pencil caliper 5 and the attached carpenter's pencil 100 therein.

Distal component 20 may further comprise a magnet 50. Magnet 50 is a magnet or an object made from a material that is magnetized and creates its own magnetic field. Magnet 50 is located on the workpiece side of mid-section socket 22. Magnet 50 is inserted into the workpiece side of mid-section socket 22 so that the surface of magnet 50 is flush with the outer surface the workpiece side of mid-section socket 22. Magnet 50 functions to allow the carpenter pencil caliper 5 and the attached carpenter's pencil 100 to be stored or stuck onto a metal workpiece or toolbox. Using the magnet 50, the carpenter pencil caliper 5 and the attached carpenter's pencil 100 may simply be stuck onto a toolbox or other metal surface for storage.

Distal component 20 may be made from any know material such as plastic, wood, metal, composite, or any other material. In best mode, distal component 20 is a one-piece structure or a unibody structure wherein all its components like mid-section socket 22, a first tab 32, a second tab 34, and a third tab 44 are all made from the same piece of material. In best mode, proximal component 10 is made of plastic that has been molded or 3-D printed to form the specially shaped rigid member.

In order to use carpenter pencil caliper 5, the distal component 20 is attached to a carpenter's pencil 100 by sliding it over the proximal end or the distal end of the carpenter's pencil 100. Then, the proximal component 10 is attached to the proximal end of a carpenter's pencil. The assembly may then be used to measure the width, outside dimension, or an overall outer dimension of a workpiece 100 as depicted in FIG. 8. The assembly may also be used to measure an inside dimension or an inside gap measurement of a workpiece 100 as depicted in FIG. 9. The assembly may also be used to measure the height of a workpiece 100 as depicted in FIG. 10. The assembly may also be used to mark or scribe a line at an exact location on a workpiece as depicted in FIGS. 11-16. These lines may be used to mark for a cut or bend that is required in the workpiece 100. The assembly may also be used to mark or scribe an exactly sized circle at an exact location on a workpiece 100 as depicted in FIGS. 17-19. These circle may be used to mark for a hole that is required in the workpiece 100.

What is claimed is:

1. A carpenter pencil caliper comprising: a proximal component and a distal component, wherein said proximal component has a proximal end, a distal end, an imprint side, a workpiece side, a first side, and a second side, said proximal component comprises: an end socket; a first tab; and a second tab, said end socket is a rigid cup-shaped member, concave-shaped member, or socket-shaped member located at said distal end of said proximal component, said end socket has an inside width and an inside length, said inside width and inside length sized to fit onto a proximal end of a carpenter pencil, said first tab on said proximal component is a solid rigid rectangular cuboid member located on said first side of said proximal component, said first tab on said proximal component protrudes outward from said first side of said proximal component, said second tab on said proximal component is a solid rigid rectangular cuboid member located on said workpiece side said proximal component, said second tab on proximal component protrudes outward from said workpiece side of said proximal component, said distal component has a proximal end, a distal end, an imprint side, a workpiece side, a first side, and a second side, said distal component comprises: a mid-section socket; a first tab; a second tab; a third tab, and a carpenter's pencil cradle, said mid-section socket is a rigid C-shaped member, concave-shaped member, or cradle-shaped member located on said workpiece side of said distal component, said mid-section socket has an inside width and an inside length, said inside width and inside length sized to fit onto said carpenter pencil, said first tab on said distal component is a solid rigid rectangular cuboid member located on said first side of said distal component, said first tab on said distal component protrudes outward from said first side of said distal component, said second tab on said distal component is a solid rigid rectangular cuboid member located on said second side of said distal component, said second tab on said distal component protrudes outward from said second side of said distal component, said third tab on said distal component is a solid rigid rectangular cuboid member located on said second side of said distal component, said third tab on said distal component protrudes outward from said second side of said distal component, said carpenter's pencil cradle is a groove, notch, nest, or cradle defined by said second tab on said distal component and said third tab on said distal component, and said second tab on said distal component is separated from said third tab on said distal component by a distance sized to make a fit with a second carpenter pencil.

2. A carpenter pencil caliper as recited in claim 1 further comprising: a first graduation line, wherein said first graduation line is a line on said imprint side of said distal component, adjacent to said first side of said distal component.

3. A carpenter pencil caliper as recited in claim 1 further comprising a second graduation line, wherein said second graduation line is a line on said imprint side of said distal component, adjacent to said second side of said distal component.

4. A carpenter pencil caliper as recited in claim 1 further comprising first arrow indicator, wherein said first arrow indicator is an arrow or triangle shape on said imprint side of said distal component adjacent to said first side of said distal component.

5. A carpenter pencil caliper as recited in claim 1 further comprising second arrow indicator, wherein said second arrow indicator is an arrow or triangle shape on said imprint side of said distal component, adjacent to said second side of said distal component.

* * * * *